(12) United States Patent
Uchida et al.

(10) Patent No.: US 8,922,735 B2
(45) Date of Patent: Dec. 30, 2014

(54) BACKLIGHT SYSTEM AND LIQUID CRYSTAL DISPLAY DEVICE USING THE SAME

(75) Inventors: Tatsuo Uchida, Sendai (JP); Yoshito Suzuki, Sendai (JP); Tohru Kawakami, Sendai (JP); Kazuo Sekiya, Sendai (JP); Masahiro Nishizawa, Sendai (JP); Takahiro Ishinabe, Sendai (JP); Baku Katagiri, Sendai (JP); Yoshihiro Hashimoto, Osaka (JP); Shoichi Ishihara, Osaka (JP); Shuichi Kozaki, Osaka (JP); Yutaka Ishii, Osaka (JP)

(73) Assignees: Sharp Kabushiki Kaisha, Osaka (JP); Tohoku University, Miyagi (JP)

( * ) Notice: Subject to any disclaimer, the term of this patent is extended or adjusted under 35 U.S.C. 154(b) by 337 days.

(21) Appl. No.: 13/388,130

(22) PCT Filed: Jun. 2, 2010

(86) PCT No.: PCT/JP2010/059380
§ 371 (c)(1),
(2), (4) Date: Jan. 31, 2012

(87) PCT Pub. No.: WO2011/024530
PCT Pub. Date: Mar. 3, 2011

(65) Prior Publication Data
US 2012/0127398 A1   May 24, 2012

(30) Foreign Application Priority Data
Aug. 27, 2009   (JP) .................................. 2009-197242

(51) Int. Cl.
*G02F 1/1335*   (2006.01)

(52) U.S. Cl.
CPC ................... *G02F 1/133606* (2013.01); *G02F 2001/133607* (2013.01)

USPC ............................................... 349/69; 349/66

(58) Field of Classification Search
USPC ....................................................... 349/66, 69
See application file for complete search history.

(56) References Cited

FOREIGN PATENT DOCUMENTS

| JP | 10-187058 A | 7/1998 |
|---|---|---|
| JP | 11-142627 A | 5/1999 |
| JP | 2005-10820 A | 1/2005 |
| JP | 2005-259361 A | 9/2005 |
| JP | 2006-227117 A | 8/2006 |
| JP | 2007-53019 A | 3/2007 |
| JP | 2007-179971 A | 7/2007 |
| JP | 2007-271730 A | 10/2007 |
| JP | 2007-328218 A | 12/2007 |

OTHER PUBLICATIONS

Official Communication issued in International Patent Application No. PCT/JP2010/059380, mailed on Jun. 29, 2010.

*Primary Examiner* — Phu Vu
(74) *Attorney, Agent, or Firm* — Keating & Bennett, LLP

(57) ABSTRACT

A backlight system includes: a light-emitting section (1) having a plurality of light sources that emit beams of light at different dominant wavelengths from one another; and an imaging optical system (3) including a plurality of microlenses (3a) that focus beams of light emitted from the light-emitting section (1), the backlight system irradiating a liquid crystal panel with beams of light having passed through the imaging optical system (3), the liquid crystal panel including a plurality of pixels arrayed at a predetermined pitch from each other, on the assumption that the pitch at which the pixels are arrayed is denoted as P and the imaging optical system (3) has an imaging magnification of (1/n), the light sources (1) being arrayed at a pitch (P1) given as P1=n×P, the microlenses (3a) being arrayed at a pitch (P2) given as P2=(n/(n+1))×P.

27 Claims, 14 Drawing Sheets

$P_1 = n \times P$
$P_2 = \{n/(n+1)\} \times P$
$b = \{(n+1)/n\} \times f$
$a = n \times b$
$(1/a) + (1/b) = 1/f$
*LIGHT INTENSITY
 DISTRIBUTION CURVE

FIG. 9

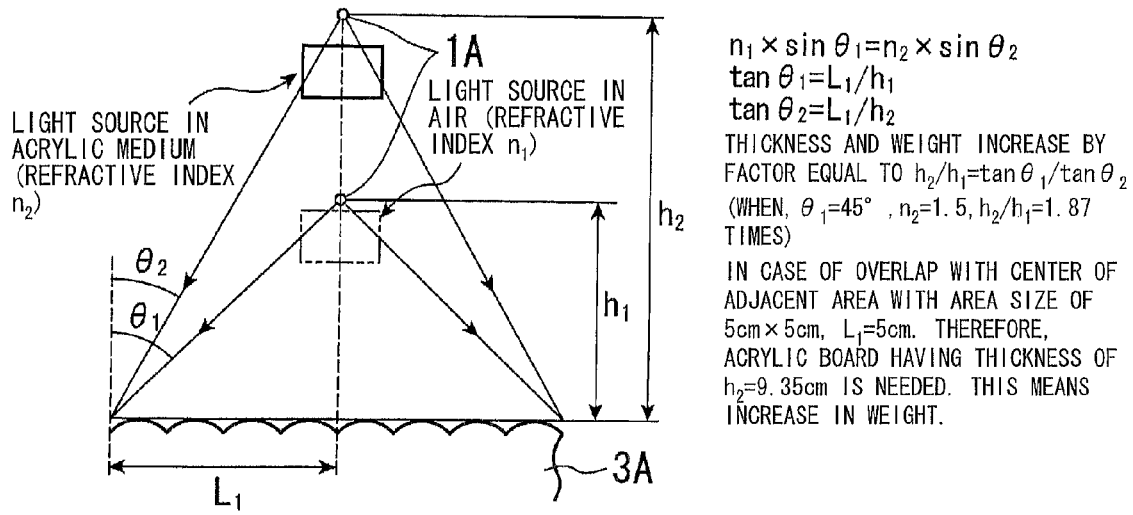

$n_1 \times \sin\theta_1 = n_2 \times \sin\theta_2$
$\tan\theta_1 = L_1/h_1$
$\tan\theta_2 = L_1/h_2$
THICKNESS AND WEIGHT INCREASE BY FACTOR EQUAL TO $h_2/h_1 = \tan\theta_1/\tan\theta_2$
(WHEN, $\theta_1 = 45°$, $n_2 = 1.5$, $h_2/h_1 = 1.87$ TIMES)
IN CASE OF OVERLAP WITH CENTER OF ADJACENT AREA WITH AREA SIZE OF 5cm×5cm, $L_1 = 5$cm. THEREFORE, ACRYLIC BOARD HAVING THICKNESS OF $h_2 = 9.35$cm IS NEEDED. THIS MEANS INCREASE IN WEIGHT.

FIG. 10

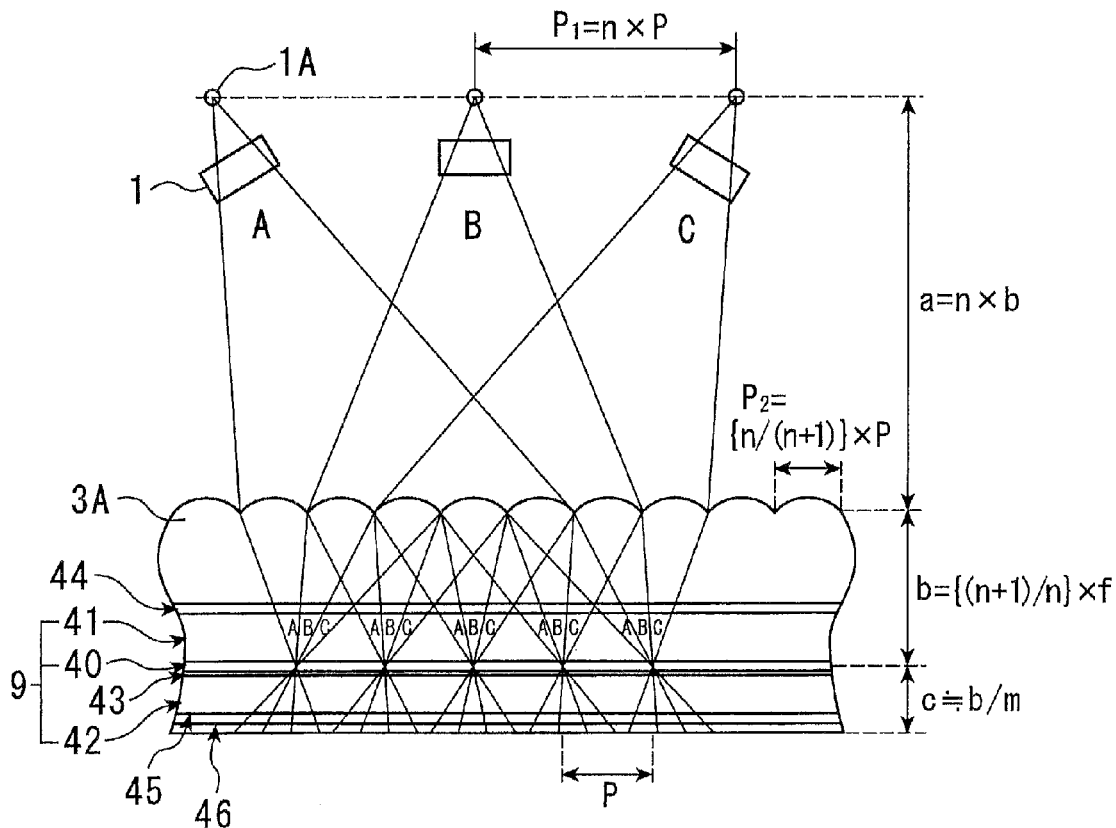

BACKLIGHT SYSTEM AND LIQUID CRYSTAL DISPLAY DEVICE USING THE SAME

TECHNICAL FIELD

The present invention relates to backlight systems and liquid crystal display devices using such backlight systems and, more particularly, to a backlight system that focuses different colors of light onto the back surfaces of their corresponding picture elements, into which each pixel of a transmissive liquid crystal display element has been divided according to color, and to a liquid crystal display device that carries out a full-color display by using such a backlight system and such a liquid crystal display element.

BACKGROUND ART

Conventionally, a liquid crystal display device that carries out a full-color display achieves a full-color display by dividing each pixel of a transmissive liquid crystal display element into three picture elements, attaching red (R), green (G), and blue (B) color filters to the three picture elements, respectively, irradiating the three picture elements with white light from a backlight, and controlling, according to a signal representing a voltage applied to a liquid crystal cell of each picture element, the transmissivity of the white light passing through that picture element.

However, since each of the R, G, and B color filters transmits light of wavelengths in its corresponding wavelength range and absorbs light of wavelengths in the other wavelength ranges, such a liquid crystal display device using color filters loses approximately ⅔ of the light and therefore has a low level of efficiency in the use of light. Although there is a color-filter-free full-color display method called a field sequential color method, this method suffers from color breakup.

Meanwhile, there has been proposed a display device based on a transmissive modulation element and including a backlight device that achieves improved efficiency in the use of light in a case where LEDs (light-emitting diodes) are used as backlight light sources (see Patent Literature 1). This display device includes: an image display element (liquid crystal panel), which has openings arrayed two-dimensionally and capable of controlling the ratio of transmitted light independently for each color; a light-path-combining optical system, which has a two-dimensional array of a large number of pairs of microlenses acting as convexo-convex lenses; a lighting optical system, which emits different colors of chief rays to the light-path-combining optical system at different angles; and a plurality of light sources, which emit different colors of light.

Since the display device of Patent Literature 1 can be configured such that the action of the lighting optical system allows the colors of light from the light sources to enter the light-path-combining optical system at chief ray angles differing from one color to another and the refracting action of the light-path-combining optical system allows the colors of light to be focused onto their corresponding openings of the image display element, it is possible to divide each pixel into three picture elements and focus different colors of light onto the picture elements, respectively (color separation of each pixel according to color of light). Therefore, according to Patent Literature 1, there will be no need for a color filter, nor will there be a loss of light, provided that an ideal color separation is achieved. Note, however, that Patent Literature 1 does not exclude provision of a color filter for preventing colors from being undesirably mixed due to light leakage when the color separation is below the ideal.

CITATION LIST

Patent Literature 1

Japanese Patent Application Publication, Tokukai, No. 2007-328218 (Publication Date: Dec. 20, 2007)

SUMMARY OF INVENTION

Technical Problem

In the display device of Patent Literature 1, the backlight device is constituted by the following components: the light-path-combining optical system, which has a two-dimensional array of a large number of pairs of microlenses acting as convexo-convex lenses; the lighting optical system, which emits different colors of chief rays to the light-path-combining optical system at different angles; and the plurality of light sources, which emit different colors of light. When, in the backlight device, different colors of chief rays emitted at different angles from the lighting optical system are allowed to directly enter the light-path-combining optical system, which has a two-dimensional array of a large number of pairs of microlenses acting as convexo-convex lenses, the colors of chief rays strike different positions on an entrance surface of the light-path-combining optical system at different angles. Therefore, in order to focus the colors of light onto openings in predetermined corresponding picture elements, it is necessary to cause the microlenses of the light-path-combining optical system to vary in shape from one position to another on the entrance surface (or, further, on an exit surface of the light-path-combining optical system). This makes designing and manufacturing extremely difficult. For this reason, as described in paragraph [0036] of Patent Literature 1, Fresnel lenses are disposed to face the entrance surface of the microlens array, and the Fresnel lenses are used so that different colors of light emitted at different angles from the lighting optical system are deflected in substantially the same direction or, preferably, in a direction substantially parallel to the optical axis of each microlens (redirected) and the different colors of light enter the microlens array at substantially the same angle regardless of their positions on the entrance surface.

In such a case as in Patent Literature 1 where a microlens array and Fresnel lenses are combined, each Fresnel lens can deflect beams of light from the lighting optical system in an area near its focal point in substantially the same direction regardless of their positions, but when irradiated with beams of light from the lighting optical system in an area near the focal point of an adjacent Fresnel lens, is irradiated with beams of light far off from the optical axis of that Fresnel lens and therefore cannot focus the beams of light onto openings in predetermined corresponding picture elements. Those beams of light which cannot be focused form stray light to cause great deterioration in image display quality. Such a phenomenon is here called a crosstalk.

For this reason, in a case where a microlens array and Fresnel lenses are combined, it is necessary to avoid a crosstalk at the boundary between areas into which a display screen has been divided. That is, it is essential to formulate a design policy that does not allow beams of light within an area to enter an adjacent area. The term "area" here means a region to be irradiated by one unit of a backlight system. Normally, the display screen is divided into a plurality of areas.

However, such a design policy gives no overlap between areas and therefore undesirably accentuates luminance unevenness and color unevenness especially at the boundary between areas into which the display screen has been divided. In particular, since color unevenness is much more conspicuous than luminance unevenness, uniformity of color with a higher degree of accuracy is required.

The present invention has been made in view of the foregoing problems, and it is an object to the present invention to provide a backlight system that can enhance display quality by suppressing luminance unevenness and color unevenness on a display screen.

Solution to Problem

In order to solve the foregoing problems, the present invention, made by radically changing the design policy, achieves uniformization by making active use of an overlap between areas without use of Fresnel lenses, which could be a factor that causes a crosstalk. A summary of configurations of the present invention is as follows:

A backlight system of the present invention includes: a light-emitting section having a plurality of light sources that emit beams of light at different dominant wavelengths from one another; and an imaging optical system including a plurality of microlenses that focus beams of light emitted from the light-emitting section, the backlight system irradiating a liquid crystal panel with beams of light having passed through the imaging optical system, the liquid crystal panel including a plurality of pixels arrayed at a predetermined pitch from each other, each of the pixels being configured to include a plurality of picture elements corresponding to each separate color, on the assumption that the pitch at which the pixels are arrayed is denoted as P and the imaging optical system has an imaging magnification of $(1/n)$, the light sources being arrayed at a pitch $P_1$ given as $P_1 = n \times P$, the microlenses being arrayed at a pitch $P_2$ given as $P_2 = (n/(n+1)) \times P$.

A liquid crystal display device of the present invention has such a backlight system as that described above, the liquid crystal display device including: a liquid crystal element including a liquid crystal layer and entrance-side and exit-side glass substrates disposed on light entrance and exit sides, respectively, so that the liquid crystal layer is sandwiched therebetween; a drive element, which drives the liquid crystal element; a polarizer disposed on the entrance-side glass substrate of the liquid crystal element; an analyzer disposed on the exit-side glass substrate of the liquid crystal element; and a diffusion element disposed on an exit surface of the analyzer, the liquid crystal element, the drive element, the polarizer, the analyzer, and the diffusion element being on a side facing a light exit surface of the microlens array.

Advantageous Effects of Invention

According to the present invention, in a backlight system, beams of light from a plurality of light sources that emit different colors of light from one another can be focused onto the corresponding picture elements, respectively, and colors of light that spatially different from one another can be separated from one another. Further, in a case where such a backlight system is used as a surface emission light source for a liquid crystal display device, plural beams of light source light spatially separated from one another can be focused onto the corresponding liquid crystal layers, so that an improvement in efficiency in the use of light source light and a full-color display can be achieved at the same time. Further, luminance unevenness and color unevenness between areas within the display screen are effectively reduced, and a higher-quality display is achieved. In addition to these, a reduction in thickness can be addressed, and the efficiency in the use of light can also be enhanced.

BRIEF DESCRIPTION OF DRAWINGS

FIG. 1 is a schematic view (cross-sectional view) schematically showing an example of an embodiment of the present invention.

FIG. 2 is a schematic view (cross-sectional view) schematically showing an example of an embodiment of the present invention.

FIG. 3 is a schematic view (cross-sectional view) schematically showing an example of an embodiment of the present invention.

FIG. 4 is a schematic view (cross-sectional view) schematically showing an example of an embodiment of the present invention.

FIG. 5 is a schematic view (cross-sectional view) schematically showing an example of an embodiment of the present invention.

FIG. 6 is a schematic view (cubic diagram) schematically showing an example of an embodiment of the present invention.

FIG. 7 is a schematic view (cubic diagram) schematically showing an example of an embodiment of the present invention.

FIG. 8 is a schematic view (cubic diagram) schematically showing an example of an embodiment of the present invention.

FIG. 9

FIG. 9 is a schematic view (cross-sectional view) schematically showing a problem that arises during mounting.

FIG. 10

FIG. 10 is a schematic view (cross-sectional view) schematically showing an example of an embodiment of the present invention.

FIG. 11 is an explanatory diagram (cross-sectional view) schematically showing the definition of an effective luminous point.

FIG. 12 is a schematic view (cross-sectional view) schematically showing an example of an embodiment of the present invention.

FIG. 13 is an explanatory diagram for explaining the principle of an optical system on which the present invention is based.

FIG. 14 shows a distribution curve of chromaticity coordinate values along a direction perpendicular to the direction along which LEDs are arrayed in an embodiment of the present invention.

FIG. 15 is a chromaticity diagram representing a spectral characteristic corresponding to the dotted line of FIG. 14.

FIG. 16 is a schematic view (cross-sectional view) schematically showing an example of an embodiment of the present invention.

DESCRIPTION OF EMBODIMENTS

An embodiment of the present invention is described below with reference to FIGS. 1 through 16. It should be noted that the present invention is not to be limited to such an embodiment.

Figure 1:
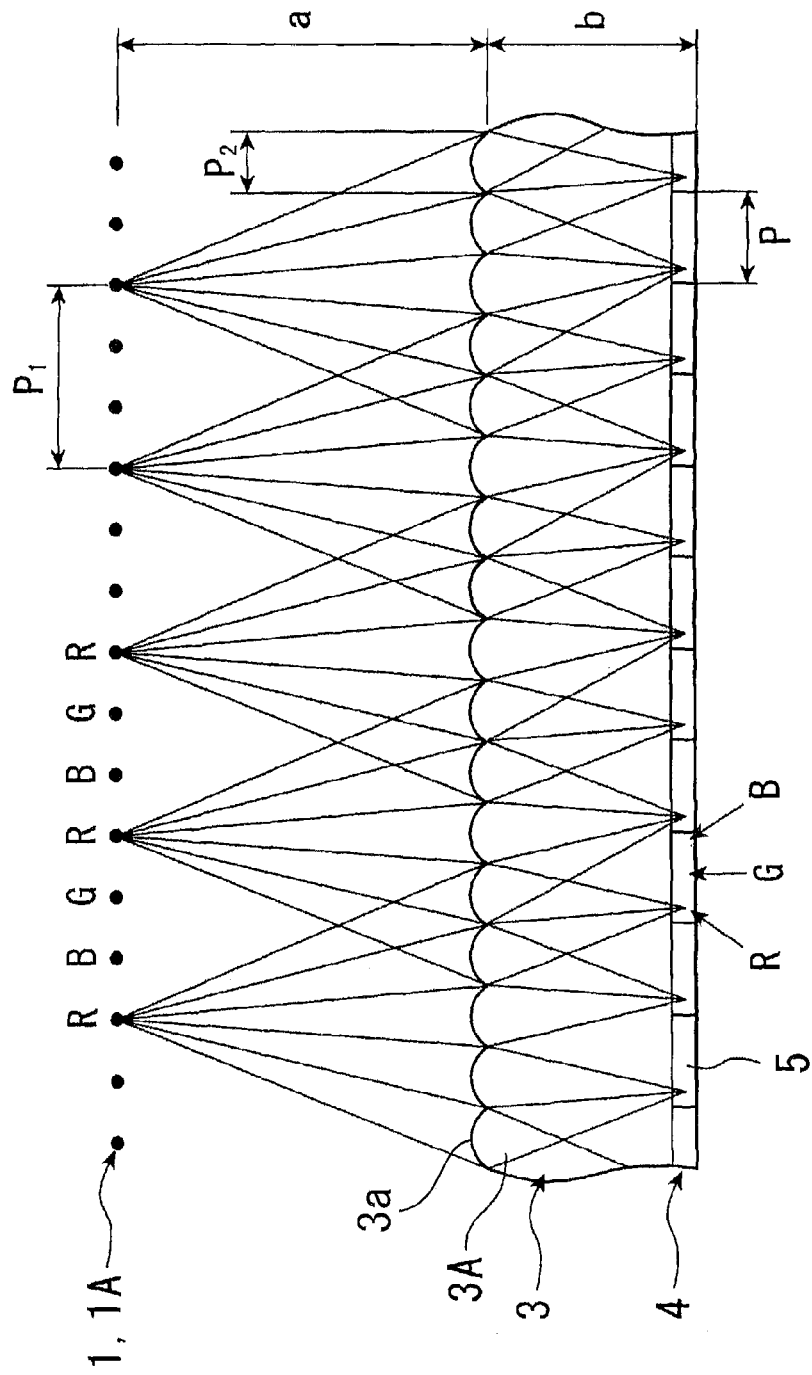
FIG. 1

FIG. 1 is a schematic view showing an example of an embodiment of the present invention. In this example, a light source array is configured by using R (red) light sources, G (green) light sources, and B (blue) light sources as a plurality of light sources (light-emitting section) 1 that emit different colors of light from one another and arraying these light sources so that groups of R, G, and B light sources arrayed in this order from the right side to the left side of FIG. 1 are joined together one after another. It should be noted that the number of types of color of light sources 1 may be four or more and the order in which the light sources in each group are arrayed does not need to be RGB.

It is preferable to use one type of LED (light-emitting diode) light source, laser light source, or organic EL (electroluminescence) light source as each of the light sources 1; however, it is possible to use a combination of two or more types. In that case, it is preferable to use, as an LED light source or an organic EL light source in such an optical system having, as shown for example in FIG. 11, a luminous point 10 and a focusing lens system 11 that focuses a beam of light from the luminous point 10, an LED lamp having an LED chip located at the luminous point 10 or an organic EL lamp having an organic EL light-emitting section located at the luminous point 10, because use of such an LED lamp or such an organic EL lamp enhances the directivity of light source light.

Figure 11:
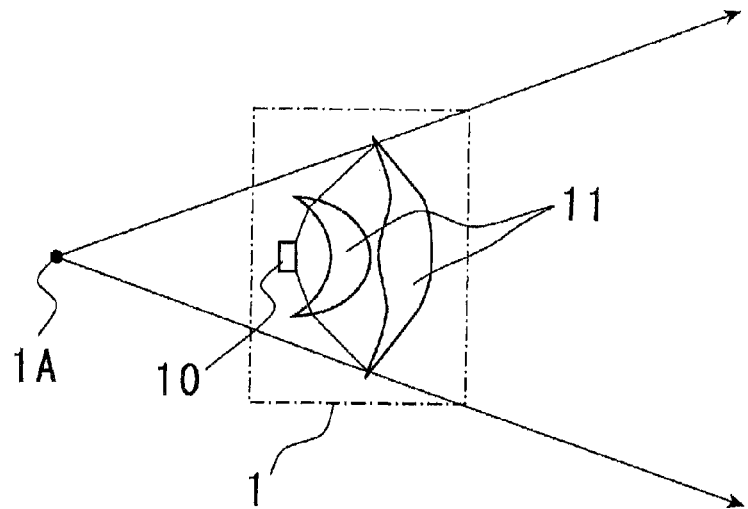
FIG. 11

The term "effective luminous point 1A" as used here in the present invention is defined as a virtual image of the luminous point 10 by the focusing lens system 11 as shown in FIG. 11. In the case of a light source 1 without such a focusing lens system 11, the effective luminous point 1A coincides with the luminous point 10.

Further, the term "pitch between effective luminous points (pitch at which light sources are arrayed) $P_1$" as used here in the present invention means a point-to-point distance between the effective luminous points 1A of light sources of the same color.

The imaging optical system 3 receives beams of light from the light source array and focuses, onto picture elements (R, G, and B picture elements arranged in this order from the left side to the right side of FIG. 1) into which each of a plurality of pixels 5, arrayed at a predetermined pitch (pixel pitch) P on an array surface of a pixel array 4, has been spatially divided according to color, the corresponding colors of light (R light onto the R picture element, G light onto the G picture element, and B light onto the B picture element).

Figure 16:
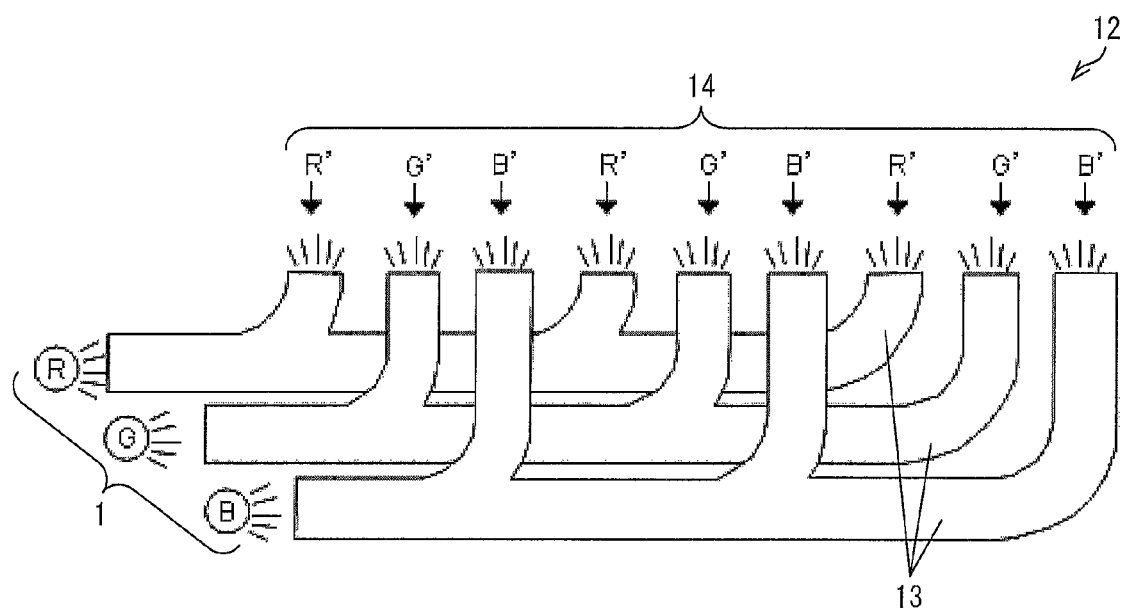
FIG. 16

It should be noted here that instead of using the light sources 1, the present invention may use, as the light-emitting section, a light-emitting device including a light source 1 and light guides 14 as shown in FIG. 16. Use of such a light-emitting device brings about a great cost-reducing effect of reducing the number of light sources. The following describes such a light-emitting device in detail.

As shown in FIG. 16, a light-emitting device 12 for use in the present invention includes light guides 13 that guide beams of light from a light source 1 toward a plurality of ends and causes the beams of light to exit through the ends, which are considered to be pseudo-light sources. For example, as shown in FIG. 16, beams of light from one RGB light source 1 are separately guided through three backlight units (light guides 13). The backlight units (light guides 13) generate R', G', and B' pseudo-light sources 14, and the imaging optical system 3 focuses beams of light from the R', G', and B' pseudo-light sources 14 onto the array surface of the pixel array 4, thereby bringing about the same effect as in a case where R, G, and B light sources are used.

In order to provide such a focusing function to the imaging optical system 3, the present invention uses, as the imaging optical system 3, a microlens array 3A having an imaging magnification of (1/n). The microlens array 3A is configured by arraying a plurality of microlenses 3a of the same shape at regular intervals. Let it be assumed here that the pitch $P_1$ between effective luminous points of the light source array (pitch at which light sources are arrayed) is given as $P_1=n \times P$, and that the pitch $P_2$ at which the microlenses 3a are arrayed is given as $P_2=(n/(n+1)) \times P$.

Thus, for example, as shown in FIG. 1, by defining the distance b from the microlens array 3A to the pixel array 4 according to the focal length f of the microlens array 3A as $b=((n+1)/n) \times f$ and defining the chief ray path length a from each effective luminous point 1A to the microlens array 3A as $a=n \times b$, beams of light from R, G, and B light sources can be focused onto R, G, and B picture elements, respectively. In other words, a real image 1/n times as big can be formed onto the pixel array as the light source array.

In each picture element, images formed by beams of light from a plurality of light sources that emit a color of light corresponding to the color of that picture element overlap with each other. Therefore, spatial uniformization is achieved, so that there no longer exists a structure at the boundary between areas into which the display screen has been divided. This effectively reduces luminance unevenness and color unevenness between areas within the display screen, thus achieving a higher-quality display.

It should be noted that FIG. 1 illustrates only the paths of beams of light (R light) from the R light sources to the R picture elements and omits to illustrate the paths of G light or B light.

Figure 13:
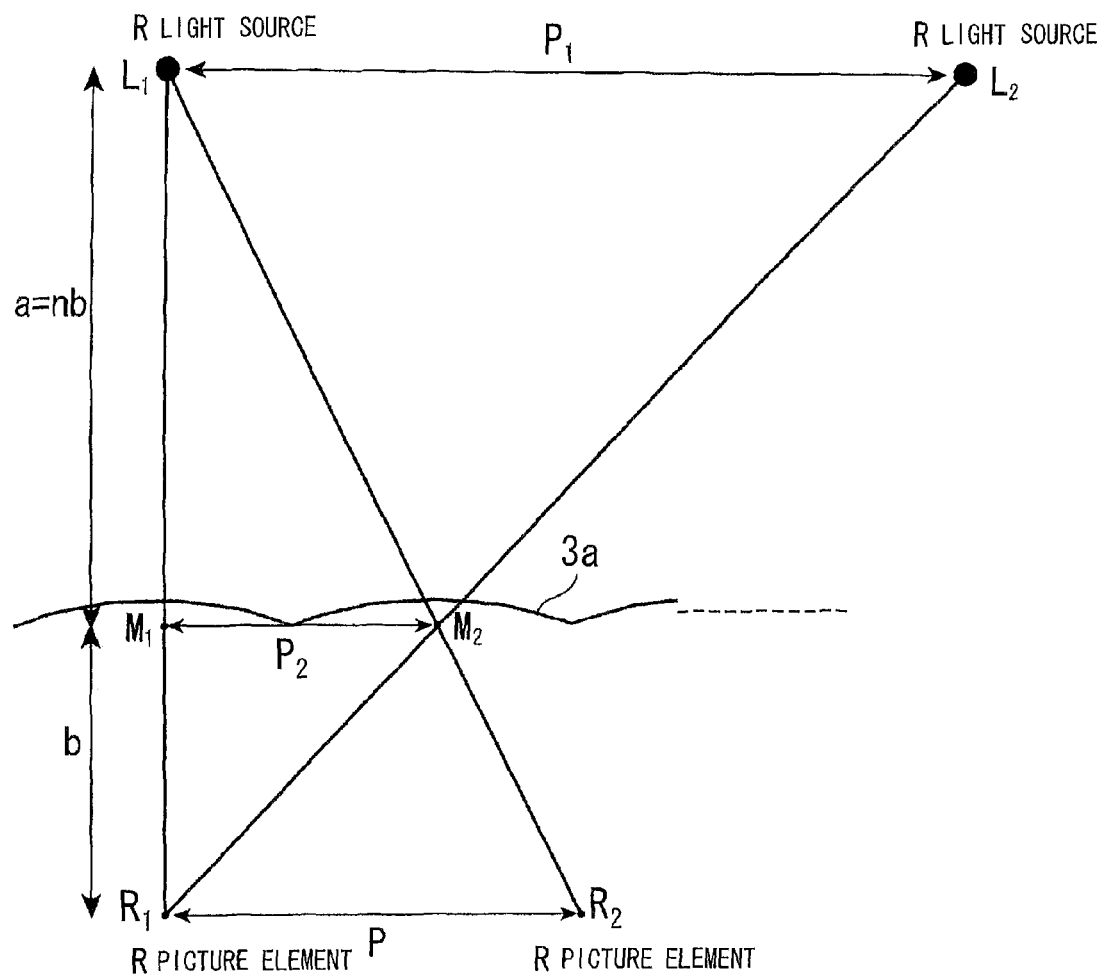
FIG. 13

The principle of an optical system that both focuses beams of light from the R, G, and B light sources onto the R, G, and B picture elements, respectively, and causing beams of light from a plurality of light sources of the same color to lap over an identical picture element is mathematically explained with reference to FIG. 13. It should be noted that FIG. 13 illustrates only the paths of chief rays passing through the center of a microlens 3a and omits to illustrate the path of G light or B light. FIG. 13 also omits to illustrate a refraction phenomenon that occurs at the interface of the microlens 3a due to a difference in refractive index. Let it be assumed here that $L_1$ and $L_2$ denote the positions of two R light sources adjacent to each other in FIG. 13, that $M_1$ and $M_2$ denote the centers of microlenses 3a, and that $R_1$ and $R_2$ denote R picture elements.

First, in order for a beam of light from each R light source to be focused onto each separate R picture element, it is necessary that the triangle $L_1R_1R_2$ and the triangle $L_1M_1M_2$ have a relationship of similarity with each other in FIG. 13. For the satisfaction of this relationship, the following formula must hold:

$$\text{Line } M_1M_2/\text{Line } L_1M_1 = \text{Line } R_1R_2/\text{Line } L_1R_1.$$

The pitch $P_2$ at which the microlenses 3a are arrayed corresponds to the line $M_1M_2$ and therefore is derived from the following relational expression based on the above formula:

$$\text{Line } M_1M_2 = \text{Line } L_1M_1 \times \text{Line } R_1R_2/\text{Line } L_1R_1,$$

where Line $L_1M_1=a=n\times b$, Line $R_1R_2=P$, and Line $L_1R_1=a+b=(n+1)\times b$. Therefore, the line $M_1M_2$ is calculated as $M_1M_2=n\times P/(n+1)$. Accordingly, in a case where the line $M_1M_2$, which is the lens pitch of the microlens array, is $n\times P/(n+1)$, a beam of light from each R light source can be focused onto each separate R picture element.

Next, in order for beams of light from a plurality of light sources (here, beams of light from the two R light sources) to be focused on a single R picture element, it is necessary that the triangle $L_1L_2R_1$ and the triangle $M_1M_2R_1$ have a relationship of similarity with each other in FIG. 13. For the satisfaction of this relationship, the following formula must hold:

$$\text{Line } L_1L_2/\text{Line } L_1R_1=\text{Line } M_1M_2/\text{Line } M_1R_1.$$

The pitch between effective luminous points of the light source array corresponds to the line $L_1L_2$ and therefore is derived from the following relational expression based on the above formula:

$$\text{Line } L_1L_2=\text{Line } L_1R_1\times\text{Line } M_1M_2/\text{Line } M_1R_1,$$

where Line $L_1R_1=a+b=(n\times 1)\times b$ and Line $M_1R_1=b$. By applying the relationship "Line $M_1M_2=n\times P/(n+1)$" derived above. Therefore, the line $L_1L_2$ is calculated as $L_1L_2=n\times P$. Accordingly, in a case where the line $L_1L_2$, which is the pitch between the effective luminous point, is $n\times P$, beams of light from a plurality of light sources (here, beams of light from the two R light sources) can be focused on a single R picture element.

These two results show that by defining the pitch $P_1$ between effective luminous point as $P_1=n\times P$ and defining the pitch $P_2$ at which the microlenses $3a$ are arrayed as $P_2=n\times P/(n+1)$, a beam of light from each R light source can be focused onto each separate R picture element and, at the same time, beams of light from a plurality of R light sources can be focused on a single R picture element while overlapping with each other. The same applies to a case where R is replaced by G or B.

The microlens array 3A is a lens that deflects an optical path by way of (i) a surface shape of the lens or (ii) a distribution of refractive indices within the lens, and can preferably be realized in the form of a fry-eye lens composed of microlenses arrayed along two directions orthogonal to each other, a lenticular lens composed of microcylindrical lenses arrayed along one direction orthogonal to a long side thereof, or a combination of both.

It should be noted here that in a case where an optical path is deflected by a surface shape, the optical path is deflected according to the Snell's law by using a difference in refractive index at the interface on a lens surface. On the other hand, in a case where an optical path is deflected by a refractive index distribution, the light is deflected by distributing refractive indices within the lens. This means to give a gradient of refractive index inside of the lens by causing refractive indices to vary from the center to the periphery of the lens and deflect light by using the gradient of refractive index.

Although the present invention uses a light source array and a microlens array, the present invention differs from the conventional technology in that the present invention does not use a Fresnel lens. Although the present invention does not use a Fresnel lens, the direction of imaging chief rays is normal to the pixel array surface, so that such a physical phenomenon is realized as if double telecentric imaging were realized simply by using a microlens array. This phenomenon allows the present invention to realize, simply by using a microlens array, afocal double telecentric imaging, which has conventionally been realized by a combination of a Fresnel lens and a microlens array. This gives a uniform structure that makes it possible to avoid a crosstalk at the boundary between areas.

Of course, for example, in a case where such an image is displayed that there is a great different in luminance between a considerably wide region and the remaining region within the entire screen, the division of the entire screen into a plurality of blocks makes it easier to control luminance and color. As an example of this embodiment, the present invention is preferably configured such that: the light source array and the microlens array are divided into a plurality of blocks, and the light sources have their optical axes rotated so that beams of light emitted from the blocks of the light source array at least substantially equally enter the corresponding blocks of the microlens array, respectively.

Figure 2:
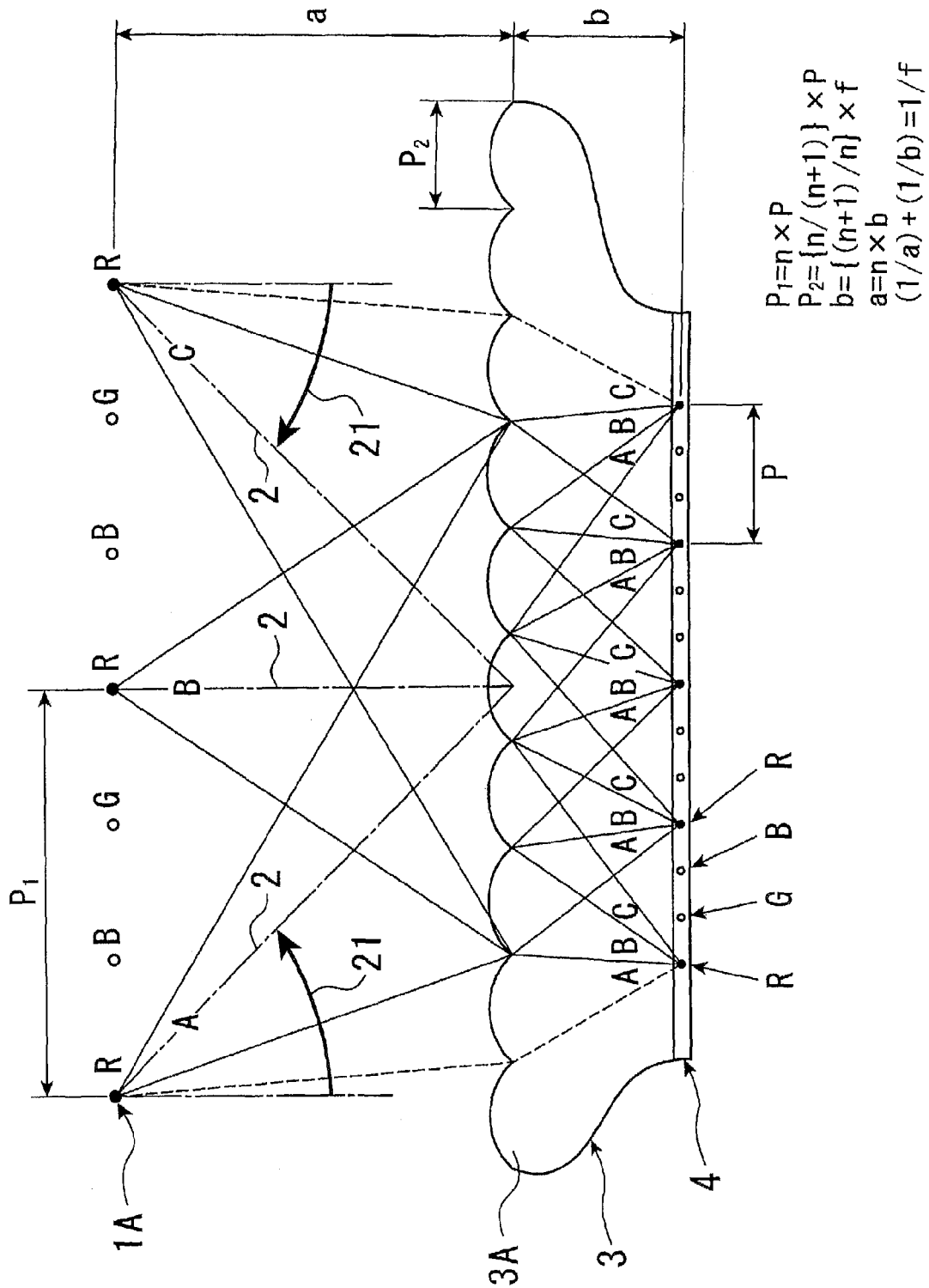
FIG. 2

An example of this embodiment is shown in FIG. 2. FIG. 2 illustrates a state in which in order that beams of light emitted from three R light sources (A, B, C) within the same block substantially equally enter the corresponding block of the microlens array 3A, the two R light sources (A, C) at both sides have their optical axes 2 rotated on their respective effective luminous points 1A in the direction of arrows 21. The same applies to the G light sources and the B light sources.

Figure 3:
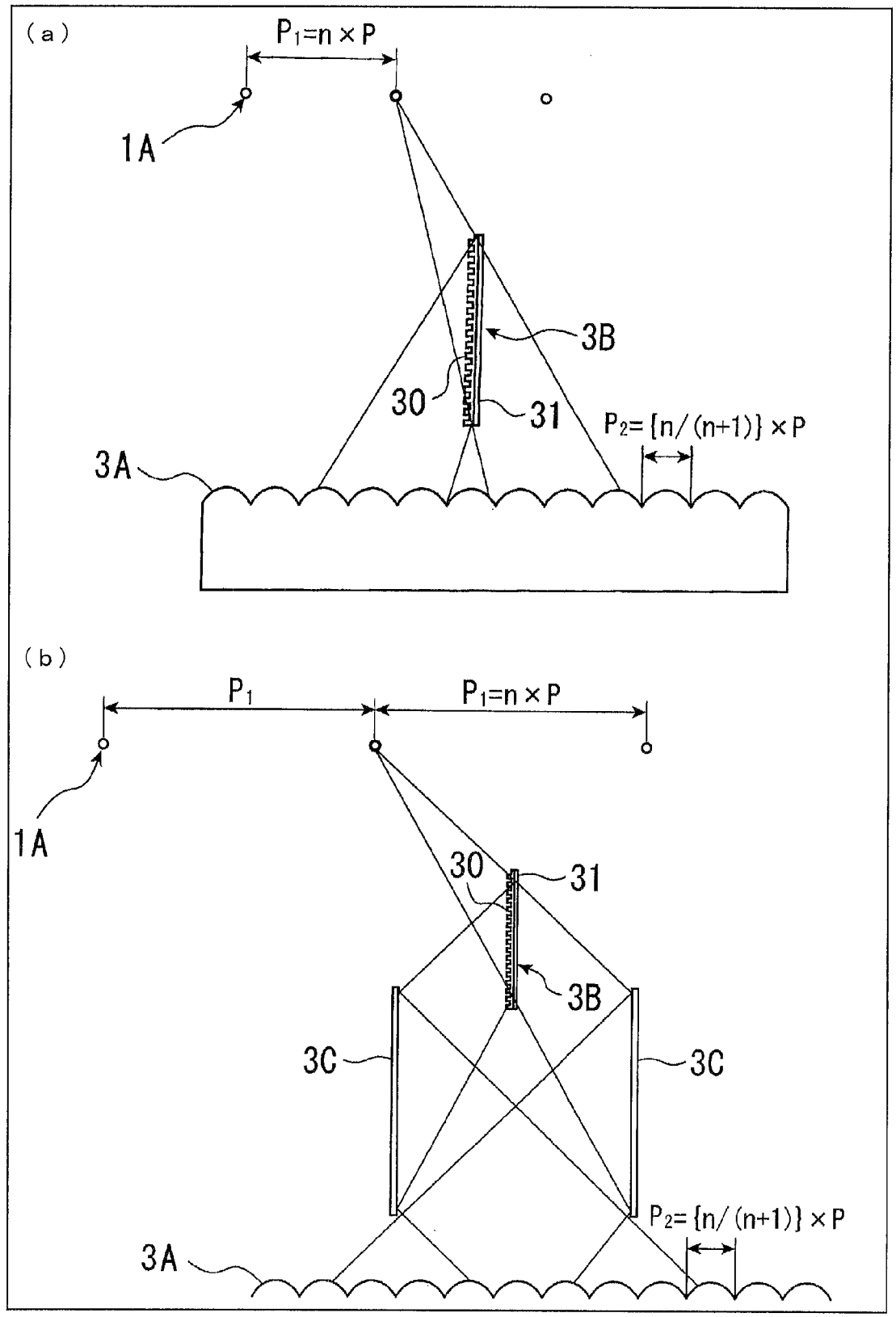
FIG. 3

Further, for example, as shown in (a) of FIG. 3, the present invention adds, as a constituent element of the imaging optical system 3, a PS conversion element 3B which faces an entrance side of the microlens array 3A and which includes an element 30 that transmits a particular polarized beam of light and reflects a remaining beam of light and a ½ wavelength plate 31 on top of which the element 30 is joined.

This allows only a particular polarized beam of light to enter the microlens array 3A. Therefore, in a case where the pixel array is formed by a liquid crystal element, a polarizer facing an entrance to the liquid crystal element is set so that the particular polarized beam of light can be transmitted. This almost completely prevents the polarizer from absorbing light, thus improving efficiency in the use of light. A preferred example of the element 30 that transmits a particular polarized beam of light and reflects a remaining beam of light is a wire grid polarizer manufactured by Asahi Kasei Corporation.

It should be noted that (a) of FIG. 3 illustrates only effective luminous points corresponding to light sources of the same single color and omits to illustrate those of the other colors, so as to avoid making the drawing complicating. Similarly, each of those subsequent drawings which illustrate only effective luminous points corresponding to light sources of the same single color omits to illustrate those of the other colors.

Further, for example, as shown in (b) of FIG. 3, the present invention adds, as a constituent element of the imaging optical system 3 based on (a) of FIG. 3, a plane mirror 3C that reflects a beam of light emerging from the PS conversion element 3B and causes the beam of light to enter the microlens array 3A.

This improves efficiency in the use of light as mentioned above. In addition, in the case of blocks divided as mentioned above, the boundary between blocks can be accentuated, so that it becomes further easier to control luminance and color for each separate block.

Figure 4:
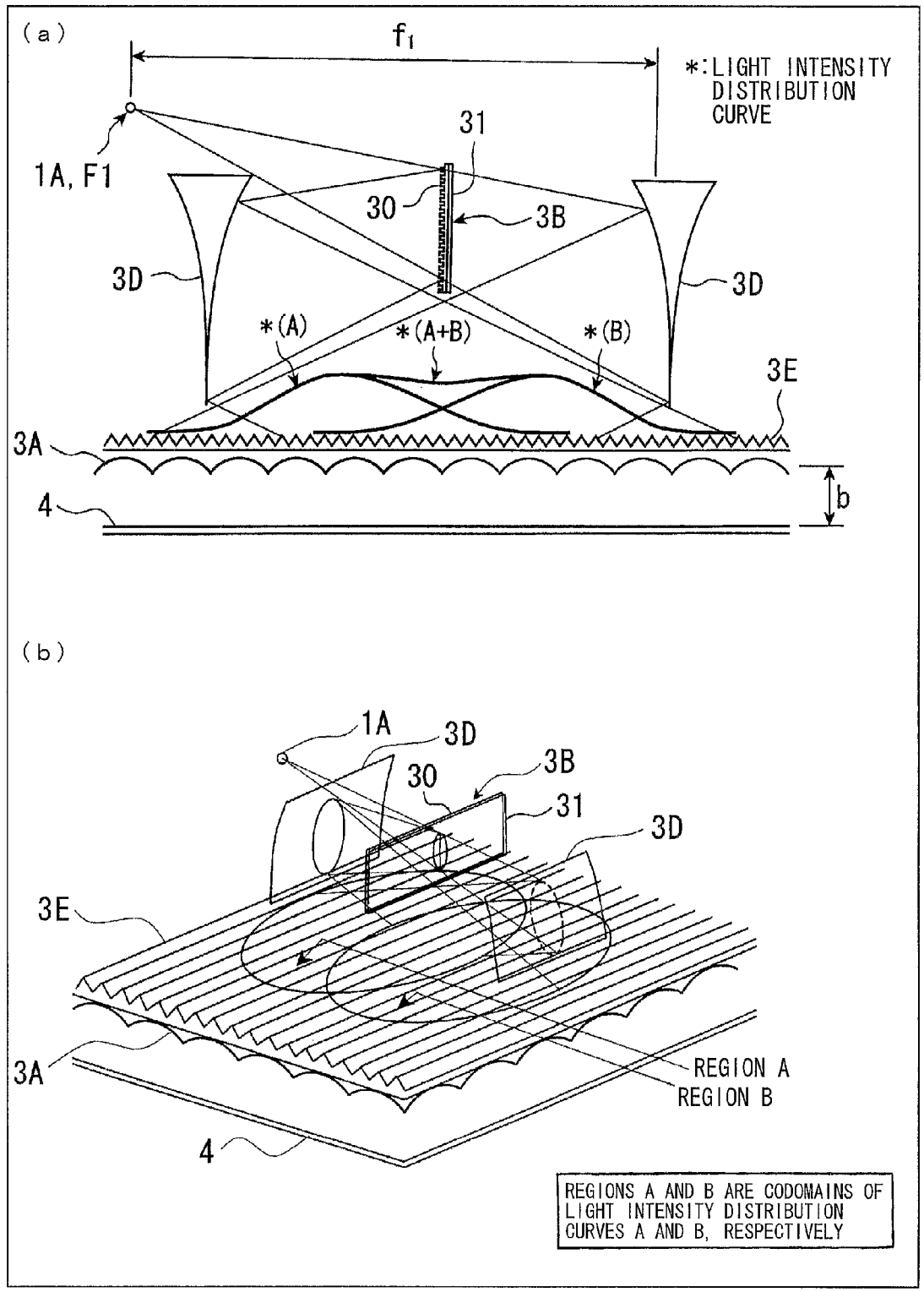
FIG. 4

Further, for example, as shown in (a) and (b) of FIG. 4, the present invention adds, as constituent elements of the imaging optical system 3 based on (a) of FIG. 3, (i) a collimating reflecting mirror 3D that reflects a beam of light emerging from the PS conversion element 3B and turns the beam of light into a beam substantially parallel to a chief ray from an effective luminous point 1A and (ii) a total reflection prism sheet 3E that totally reflects a beam of light emerging from the collimating reflecting mirror 3D and causes the beam of light to enter the microlens array 3A, wherein the effective luminous point 1A is located in an area substantially near a non-axisymmetric focal position F1 of the collimating reflecting lens 3D. It should be noted that in (a) of FIG. 4, f1 denotes the nonaxisymmetric focal length of the collimating reflecting lens 3D.

In this case, by defining the distance b from the microlens array 3A to the pixel array 4 according to the focal length f of the microlens array 3A as $b=((n+1)/n) \times f$ and defining the chief ray path length a from each effective luminous point 1A to the microlens array 3A as $a=n \times b$, beams of light from R, G, and B light sources can be focused onto R, G, and B picture elements, respectively. In other words, a real image $1/n$ times as big can be formed onto the pixel array 4 as the light source array.

This improves efficiency in the use of light as mentioned above and makes it easier to control luminance and color for each separate block. In addition, the angle of a chief ray of light source light with respect to a line normal to the pixel array surface can be made a large angle so that a drastic reduction in thickness can be achieved. It should be noted that this embodiment can achieve a uniform light intensity distribution within the same block as qualitatively shown by a light intensity distribution curve in (a) of FIG. 4 and effectively prevent light from entering an adjacent block.

Figure 5:
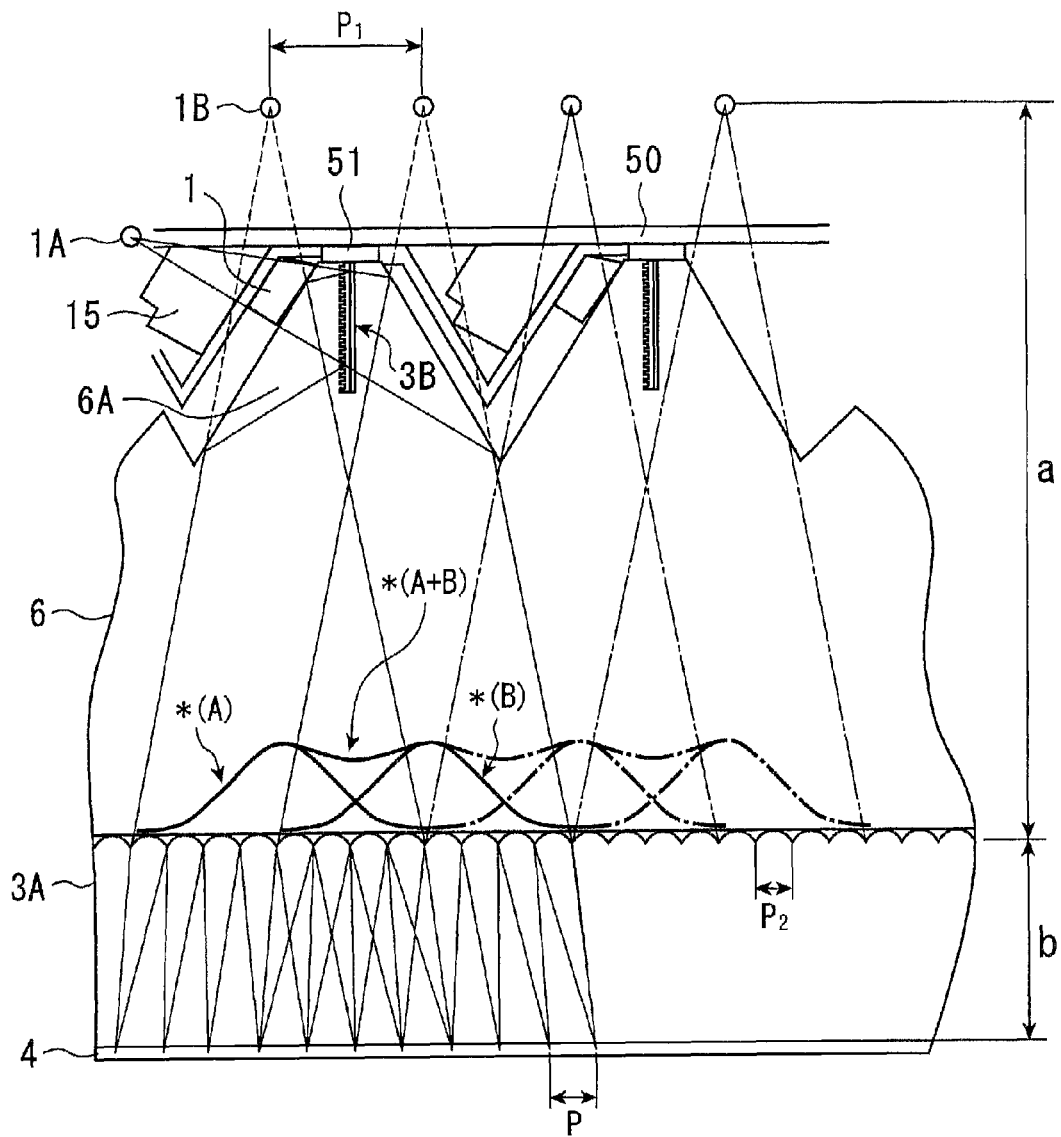
FIG. 5

Next, the present invention may be configured as shown in (a) of FIG. 3 to become an embodiment in which the light sources and the PS conversion element can be easily fixed when the light sources and the PS conversion element are mounted in a display device system (e.g., a liquid crystal television or the like). In this embodiment, for example, as shown in FIG. 5, a solid-phase refractive index medium 6 containing PS conversion elements 3B is added as a constituent element of the imaging optical system 3. The solid-phase refractive index medium 6 has a part 6A in which each PS conversion element 3B is contained, the part 6A having an isosceles triangular cross-section by an isosceles part of which a beam of light from the PS conversion element 3B is totally reflected, and the pitch $P_1$ between effective luminous points 1A is replaced by the pitch $P_1$ between virtual image points 1B that appear when a beam of light having entered the solid-phase refractive index medium 6 from an effective luminous point 1A is totally reflected by the isosceles part. That is, the pitch between effective luminous points 1A is replaced as the pitch $P_1$ by the pitch $P_1$ between virtual image points 1B that appear when a beam of light having entered the solid-phase refractive index medium 6 from an effective luminous point 1A is totally reflected by the isosceles part.

In this case, by defining the distance b from the microlens array 3A to the pixel array 4 according to the focal length f of the microlens array 3A as $b=((n+1)/n) \times f$ and defining the chief ray path length a from each virtual image 1B to the microlens array 3A as $a=n \times b$, a real image $1/n$ times as big can be formed onto the pixel array 4 as the light source array.

The solid-phase refractive index medium 6 can be made of acrylic resin, glass, or the like. It is preferable that the isosceles triangular part 6A have a vertex angle of approximately 60 degrees, because when the isosceles triangular part 6A has such a vertex angle, a beam of light obtained by causing a chief ray of light source light to be vertically incident on and totally reflected by the part 6A can be aligned substantially along the optical axis of the microlens array.

This makes it possible to fix the light sources 1 and the PS conversion elements 3B by using a back surface frame 50 and columns 51 of the display device system. Further, by using a space between isosceles triangular parts 6A adjacent to each other, light-source auxiliaries 15 (such as a drive circuit, a power source, a cooling fin, a heat sink, a cooling fan, etc.) can be mounted.

However, in a mounting embodiment in which a solid-phase refractive index medium is used as shown in FIG. 5, there is a problem with an increase in thickness (which entails an increase in weight), as in the case of FIG. 9 where an acrylic medium is used. In FIG. 9, an increment in thickness was measured at the ratio (h2/h1) of the height h2 from an effective luminous point 1A to an area $L1 \times L1$ in size irradiated by a light source in the acrylic medium to the height h1 from an effective luminous point 1A to an area $L1 \times L1$ in size irradiated by a light source in the air.

Figure 6:
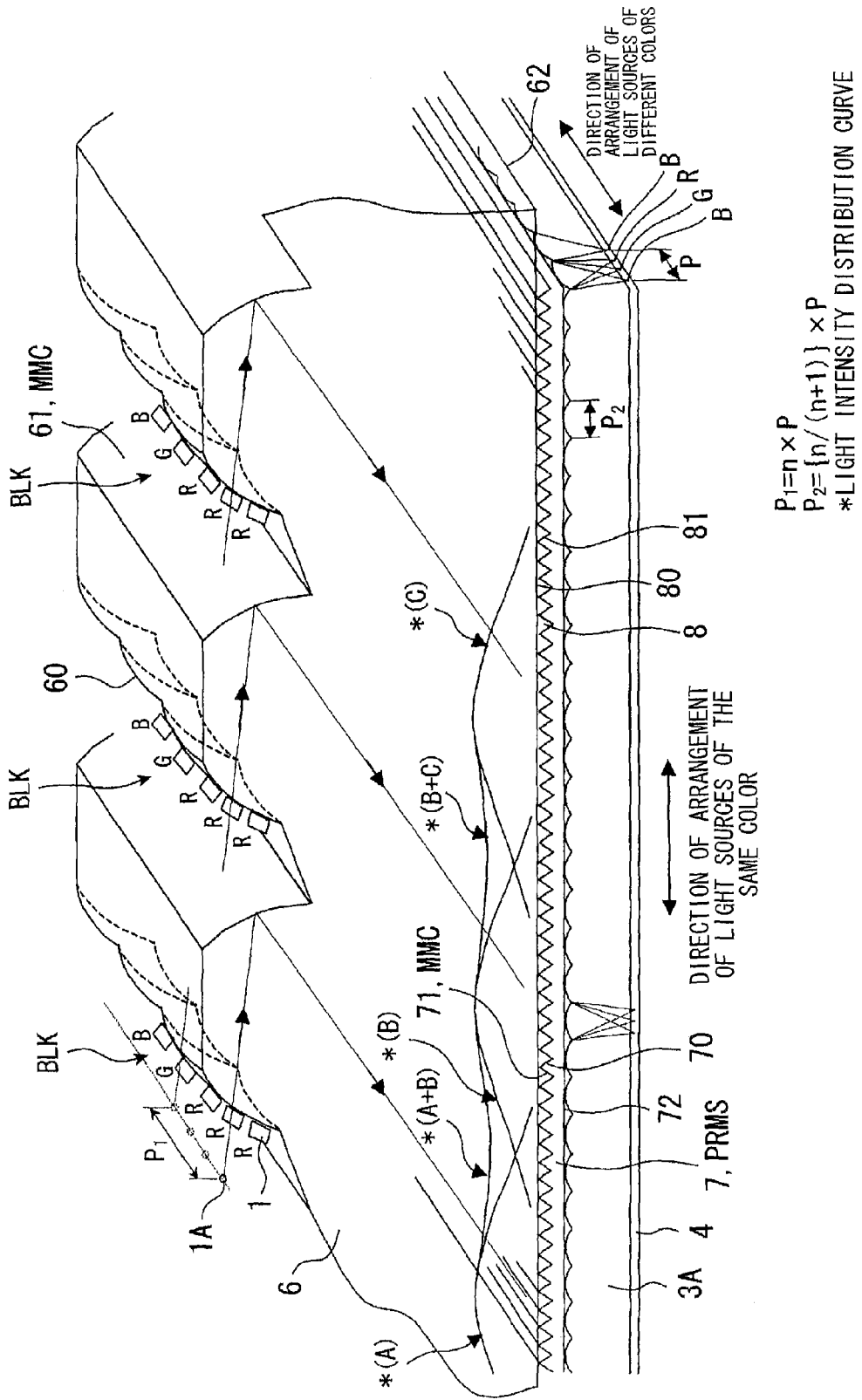
FIG. 6

Such a problem with an increase in thickness can be solved by making the direction of a chief ray from each light source as parallel as possible to the pixel array surface and, before causing it to enter the microlens array, turning back the light and then deflecting the turned-back light along the optical axis of the microlens array. FIG. 6 shows an example of a mounting structure suitable to such a turn-back method.

In this embodiment, the backlight system of the present invention is configured to cause a beam of light from each of the light sources 1 to enter a solid-phase refractive index medium 6 through an entrance surface 60 of the solid-phase refractive index medium 6, to cause the beam of light to be metallically reflected by a turn-back reflection surface 61 of the solid-phase refractive index medium 6, to cause the beam of light to exit the solid-phase refractive index medium 6 through an exit surface 62 of the solid-phase refractive index medium 6, to cause the beam of light thus emitted to enter an optical sheet 7 through an entrance surface 70 of the optical sheet 7, causes the beam of light to be reflected by a reflection surface 71 of the optical sheet 7, and to cause the beam of light to exit the optical sheet through an exit surface 72 of the optical sheet 7 toward the microlens array 3A. Further, a space between the solid-phase refractive index medium 6 and the optical sheet 7 is filled with a refractive index matching member 8. It should be noted that the solid-phase refractive index medium 6, the optical sheet 7, the refractive index matching member 8 are added as constituent elements of the imaging optical system 3.

The entrance surface 60 of the solid-phase refractive index medium 6 is a parallel arrangement of identical shapes for each separate block BLK of the light source array. The turn-back reflection surface 61 of the solid-phase refractive index medium 6 is a parallel arrangement of metal-coated reflecting mirrors MMC identical in shape for each separate block BLK of the light source array, and the metal-coated reflecting mirrors MMC serve to reflect beams of light from the entrance surface 60. The exit surface 62 of the solid-phase refractive index medium 6 is a flat surface.

The entrance surface 70 of the optical sheet 7 is one of two surfaces between which the prism vertex angle of a prism sheet PRMS lies. The reflection surface 71 of the optical sheet 7 is a surface (which corresponds to a metal-coated reflecting mirror MMC) obtained by coating the other of the two surfaces with a metal film. The exit surface 72 of the optical sheet 7 is a flat surface.

The refractive index matching member 8 has an entrance surface 80 and an exit surface 81 that are in contact with the exit surface 62 of the solid-phase refractive index medium 6 and the entrance surface 70 of the optical sheet 7, respectively.

A beam of light emitted from each of the light sources 1 enters the solid-phase refractive index medium 6 through the entrance surface 60, is turned back by the turn-back reflection surface 61 by metallic reflection, enters the refractive index matching member 8 through the exit surface 62 (entrance surface 80), goes straight to enter the optical sheet 7 through the exit surface 81 (entrance surface 70), is metallically reflected by the reflection surface 71 to exit through the exit surface 72, and enters the microlens array 3A.

The beams of light thus having entered form an image (1/n) times as big onto the pixel array 4 as the array pattern of effective luminous points 1A. Since $P_1 = n \times P$ and $P_2 = (n/(n+1)) \times P$ are satisfied throughout the present invention, the pitch between effective luminous point images on the array pattern of which an image has been formed can be coincided with the pixel pitch P.

Such a turn-back method allows a drastic reduction in the distance from each light source to the pixel array surface (length of a vertical line extending from each light source to the pixel array surface), thus solving the problem with an increase in thickness.

Further, the backlight system of the present invention also gives a mounting structure suitable to the turn-back method. An example of such an embodiment is shown in (a) of FIG. 7.

In this embodiment, the backlight system of FIGS. 1 and 2 is configured to cause a beam of light from each of the light sources 1 to enter a solid-phase refractive index medium 6 through an entrance surface 60 of the solid-phase refractive index medium 6, to cause the beam of light to be metallically reflected by a turn-back reflection surface 61 of the solid-phase refractive index medium 6, to cause the beam of light to exit the solid-phase refractive index medium 6 through an exit surface 62 of the solid-phase refractive index medium 6, to cause the beam of light to be again metallically reflected by an exit-side reflection surface 63 of the solid-phase refractive index medium 6, and to cause the beam of light to exit to the microlens array 3A. It should be noted that the solid-phase refractive index medium 6 is added as a constituent element of the imaging optical system 3.

The entrance surface 60 of the solid-phase refractive index medium 6 is a parallel arrangement of identical shapes for each separate block BLK of the light source array. The turn-back reflection surface 61 of the solid-phase refractive index medium 6 is a parallel arrangement of metal-coated reflecting mirrors MMC identical in shape for each separate block BLK of the light source array, and the metal-coated reflecting mirrors MMC serve to reflect beams of light from the entrance surface 60. The exit surface 62 of the solid-phase refractive index medium 6 is one of two surfaces between which a prism vertex angle lies. The exit-side reflection surface 63 of the solid-phase refractive index medium 6 is a surface (which corresponds to a metal-coated reflecting mirror MMC) obtained by coating the other of the two surfaces with a metal film.

Figure 7:
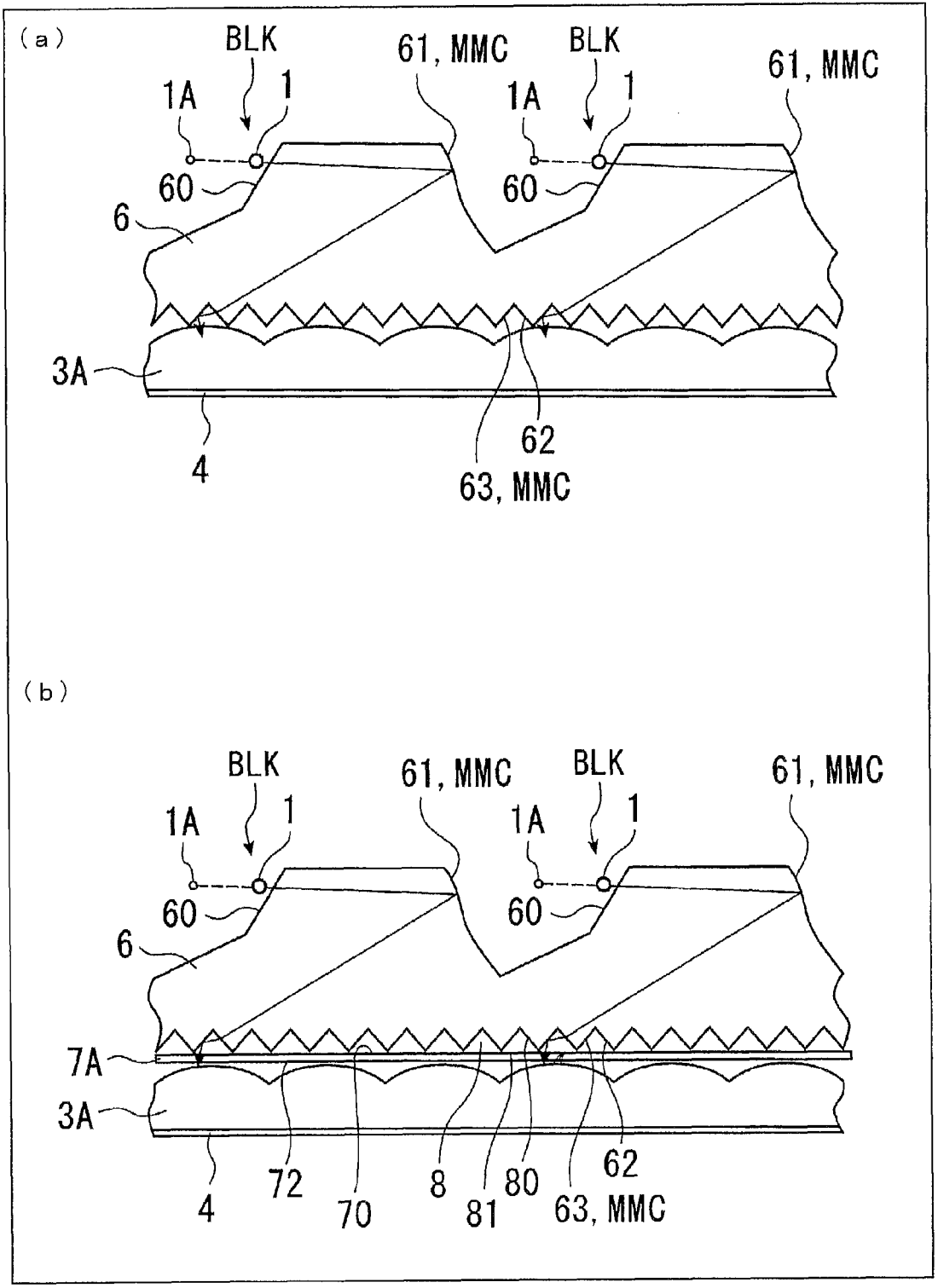
FIG. 7

The embodiment of (a) of FIG. 7 corresponds to the one that would be obtained by removing the optical sheet 7 (prism sheet PRMS) and the refractive index matching member 8 from the embodiment of FIG. 6, changing the shape of the exit surface 62 of the solid-phase refractive index medium 6 from a planar shape to a prism array shape, keep using, as the exit surface 62, one of two surfaces between which the prism vertex angle lies, and coating the other surface with a metal film to form the exit-side reflection surface 63.

A beam of light emitted from each of the light sources 1 enters the solid-phase refractive index medium 6 through the entrance surface 60, is turned back by the turn-back reflection surface 61 by metallic reflection, exit through the exit surface 62 into the air, is deflected by refraction, is further deflected by the exit-side reflection surface 63 by metallic reflection, and enters the microlens array 3A.

As in the backlight system shown in FIG. 6, the beams of light thus having entered form an image (1/n) times as big onto the pixel array 4 as the array pattern of effective luminous points 1A, and the pitch between effective luminous point images on the array pattern of which an image has been formed can be coincided with the pixel pitch P.

Further, the backlight system of the present invention also gives a mounting structure suitable to the turn-back method. An example of such an embodiment is shown in (b) of FIG. 7.

In this embodiment, the backlight system shown in (a) of FIG. 7 is configured to cause a beam of light having exited the solid-phase refractive index medium 6 through an exit surface 62 of the solid-phase refractive index medium 6 to enter an optical sheet 7A through an entrance surface 70 of the optical sheet 7A and to cause the beam of light to exit the optical sheet 7A through an exit surface 72 of the optical sheet 7A toward to the microlens array 3A. Further, a space between the solid-phase refractive index medium 6 and the optical sheet 7A is filled with a refractive index matching member 8. It should be noted that the optical sheet 7A and the refractive index matching member 8 are added as constituent elements of the imaging optical system 3.

The entrance surface 70 and exit surface 72 of the optical sheet 7A are flat surfaces that are parallel to each other. The refractive-index matching member 8 has an entrance surface 80 and an exit surface 81 that are in contact with the exit surface 62 of the solid-phase refractive index medium 6 and the entrance surface 70 of the optical sheet 7A, respectively. The refractive index matching member 8 fills a space between the exit surface 62 of the solid-phase refractive index medium 6 and the entrance surface 70 of the optical sheet 7A.

A beam of light emitted from each of the light sources 1 enters the solid-phase refractive index medium 6 through the entrance surface 60, is turned back by the turn-back reflection surface 61 by metallic reflection, enters the refractive index matching member 8 through the exit surface 62 (entrance surface 80), goes straight to be deflected by the exit-side reflection surface 63 by metallic reflection, and then enters the microlens array 3A via the entrance surface 70, an inner part of the optical sheet 7A, and the exit surface 72 in this order.

As in the backlight system shown in (a) of FIG. 7, the beams of light thus having entered form an image (1/n) times as big onto the pixel array 4 as the array pattern of effective luminous points 1A, and the pitch between effective luminous point images on the array pattern of which an image has been formed can be coincided with the pixel pitch P.

Further, in order to better control a degree of parallelization of light from the entrance surface 60 to the turn-back reflection surface 61, the backlight system of the present invention is preferably configured such that the entrance surface 60 of the solid-phase refractive index medium 6 is composed of (i) flat surfaces or (ii) lens surfaces each having a convex or concave curvature in a plane(s) orthogonal and/or parallel to the direction of arrangement of light sources 1 of the same color.

It should be noted that FIG. 6 shows an example of a case where the entrance surface 60 is composed of lens surfaces each having a convex curvature in a plane(s) orthogonal and/or parallel to the direction of arrangement of light sources 1 of the same color and that (a) and (b) of FIG. 7 shows an example of a case where the entrance surface 60 is composed flat surfaces.

Further, in order to better control a degree of parallelization of beams of light from the turn-back reflection surface 61 to the exit surface 62, the backlight system of the present invention is preferably configured such that: the turn-back reflection surface 61 of the solid-phase refractive index medium 6 is composed of surfaces (which correspond to metal-coated reflecting mirrors MMC) obtained by coating, with metal films, (i) flat surfaces or (ii) lens surfaces each having a convex or concave curvature in a plane(s) orthogonal and/or parallel to the direction of arrangement of light sources 1 of the same color, so that the beams of light from the entrance surface of the solid-phase refractive index medium are deflected by metallic reflection substantially in parallel with each other in a plane parallel to the direction of arrangement of light sources 1 of the same color.

It should be noted that FIG. 6 and (a) and (b) of FIG. 7 show an example of a configuration in which the turn-back reflection surface 61 is composed of surfaces (which corresponds to metal-coated reflecting mirrors MMC) obtained by coating, with metal films, (i) flat surfaces or (ii) lens surfaces each having a concave curvature in a plane parallel to the direction of arrangement of light sources 1 of the same color, so that the beams of light from the entrance surface 60 of the solid-phase refractive index medium 6 are deflected by metallic reflection substantially in parallel with each other in a plane parallel to the direction of arrangement of light sources 1 of the same color.

Figure 8:
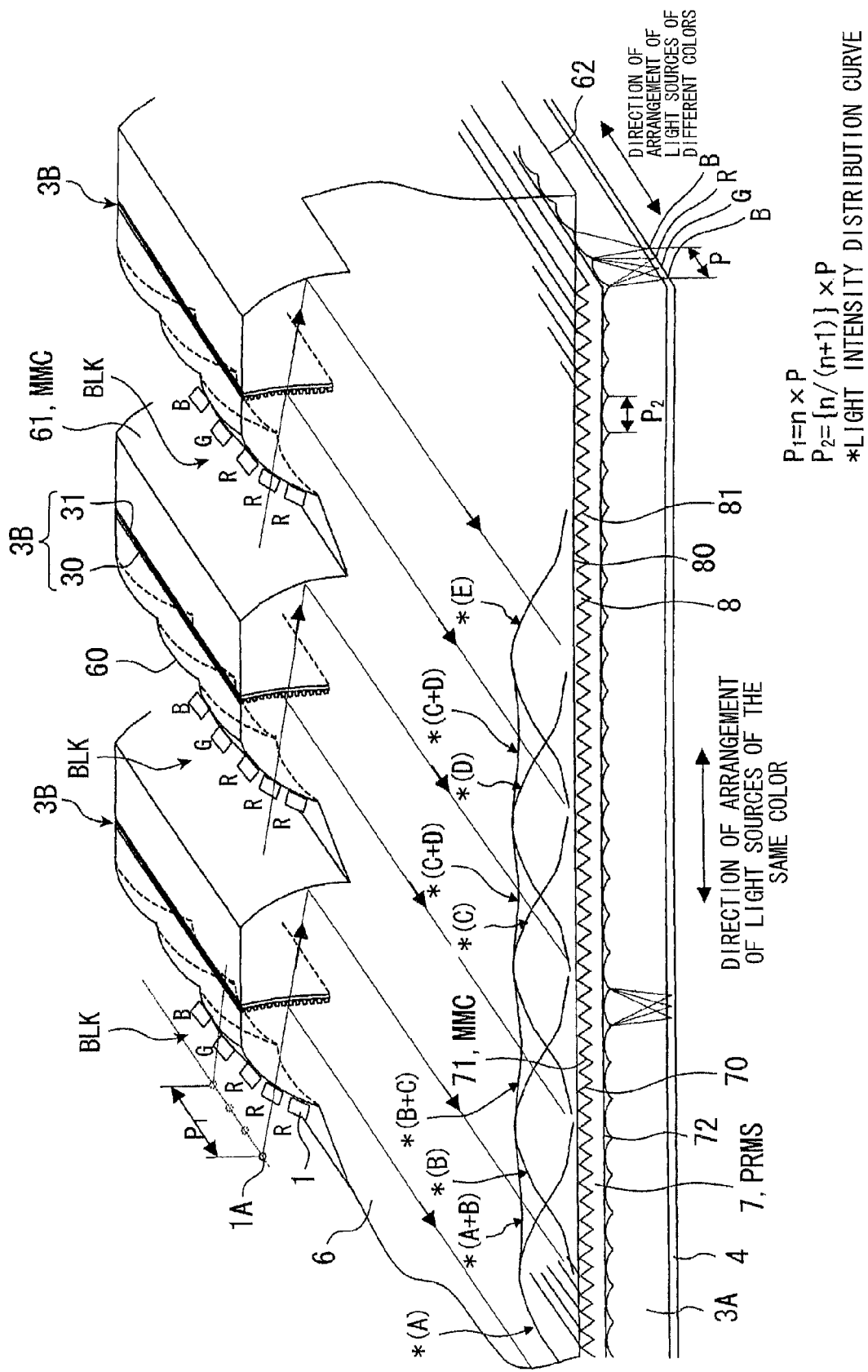
FIG. 8

Next, the backlight system of the present invention is obtained by adding a PS conversion element 3B as a constituent element of the imaging optical system 3 in any one of the backlight systems of FIG. 6 and (a) and (b) of FIG. 7, for example, as shown in FIG. 8. The PS conversion element 3B, provided in an optical path extending from the entrance surface 60 of the solid-phase refractive index medium 6 through inside of the solid-phase refractive index medium 6 to the turn-back reflection surface 61 of the solid-phase refractive index medium 6, includes an element 30 that transmits a particular polarized beam of light and reflects a remaining beam of light and a ½ wavelength plate 31 on top of which the element 30 is joined. This gives a mounting structure suitable to a case where a PS conversion element 6A is incorporated in the turn-back method. The incorporation of the PS conversion element 3B allows only a particular polarized beam of light to enter the microlens array 3A. Therefore, in a case where the pixel array is formed by a liquid crystal element, a polarizer facing an entrance to the liquid crystal element is set so that the particular polarized beam of light can be transmitted. This almost completely prevents the polarizer from absorbing light, thus improving efficiency in the use of light.

Meanwhile, an increase in area of a region that is irradiated by one backlight system leads proportionately to an increase in distance (thickness) from each light source to the pixel array. Conversely, a reduction in thickness of a backlight system can be achieved by reducing the area of a region that is irradiated by one backlight system and irradiating one pixel array (one entire screen) with a plurality of backlight systems, which makes it possible to configure a thin backlight system. This is achieved by using a backlight system as a single backlight unit and arranging a plurality of such backlight units in parallel with each other. However, an increase in the number of backlight units that are used for the pixel array leads to an increase in the number of components and therefore to a rise in manufacturing cost. Therefore, there is a trade-off between manufacturing cost and thickness.

Further, the backlight system of the present invention is preferably configured to include means for controlling an amount of light of the light sources for each one of or for every two or more of the plurality backlight units arranged in parallel with each other, the means being intended to easily change brightness in different places within a single entire screen.

Further, in an embodiment in which a plurality of backlight units are arranged in parallel with each other, it is preferable, for the purpose of reducing manufacturing costs and dispensing with an alignment step, that the plurality of backlight units shares an integrated imaging optical system with each other instead of having a plurality of imaging optical systems respectively.

An ideal embodiment of the backlight system is the one in which the integrated imaging optical system is as large as the single entire screen. However, in actual manufacturing, an integrated embodiment needs only be employed which is judged as best suited in consideration of manufacturing costs, the number of part-assembling steps, and the like.

The following describes a liquid crystal display device of the present invention. The liquid crystal display device of the present invention is a liquid crystal display device having such a backlight system as that described above and, for example, is such a liquid crystal display device as that shown in FIG. 10.

The liquid crystal display device of the present invention is a liquid crystal display device including: a liquid crystal element 9 obtained by sandwiching a liquid crystal layer 40 between an entrance-side glass substrate 41 and an exit-side glass substrate 42, the liquid crystal layer 40 forming an array of pixels; a drive element 43 sandwiched between the liquid crystal layer 40 and the exit-side glass substrate so as to drive the liquid crystal element 9; a polarizer 44 disposed on the entrance-side glass substrate 41 of the liquid crystal element 9; an analyzer 45 disposed on the exit-side glass substrate 42 of the liquid crystal element 9; and a diffusion film 46 disposed on an exit surface of the analyzer 45, the liquid crystal element 9, the drive element 43, the polarizer 44, the analyzer 45, and the diffusion film 46 being on a side facing an exit surface of the microlens array 3A. (The order in which these components are joined on top of each other starting from the entrance side is as follows: "polarizer/entrance-side glass substrate/liquid crystal layer/drive element/exit-side glass substrate/analyzer/diffusion film".)

A beam of light from each of the light sources 1 enters the microlens array 3A, passes through the polarizer 44 and the entrance-side glass substrate 41 to be focused on a picture element of the liquid crystal layer 40, passes through the exit-side glass substrate 42 and the analyzer 45 to be diffused by the diffusion film 46, and goes out. It should be noted that since the drive element 43 is disposed at the boundary between pixels of the liquid crystal layer 40, the drive element 43 does not affect beams of light that pass through the pixels.

Further, the same effects can also be obtained by joining "the liquid crystal layer 40, the polarizer 44, and the entrance-side glass substrate 41" on top of each other in this order from the liquid crystal layer 40 toward the entrance side in the liquid crystal display device shown in FIG. 10, instead of joining "the liquid crystal layer 40, the entrance-side glass substrate 41, and the polarizer 44" on top of each other in this order from the liquid crystal layer 40 toward the entrance side. Alternatively, the same effects can also be obtained by joining "the liquid crystal layer 40, the drive element 43, the analyzer 45, the exit-side glass substrate 42, and the diffusion film 46" on top of each other in this order from the liquid crystal layer 40 toward the exit side in the liquid crystal display device shown in FIG. 10, instead of joining "the liquid crystal layer 40, the drive element 43, the exit-side glass substrate 42, the analyzer 45, and the diffusion film 46" on top of each other in this order from the liquid crystal layer 40 toward the exit side.

Meanwhile, since, in the liquid crystal display device shown in FIG. 10, the exit-side glass substrate 42 is interposed between the liquid crystal layer 40 and the analyzer 45, there occurs a case, depending on the thickness of the exit-side glass substrate 42, where beams of light having passed through adjacent picture elements and having reached the analyzer 45 overlap with each other, so that there is concern that the overlapping beams of light are diffused by the diffusion film 45 to invite deterioration in image quality.

For the prevention of such deterioration in image quality, it is preferable to join "the liquid crystal layer 40, the drive element 43, the analyzer 45, the diffusion film 46, and the exit-side glass substrate 42" on top of each other in this order from the liquid crystal layer 40 toward the exit side in the liquid crystal display device shown in FIG. 10, instead of joining "the liquid crystal layer 40, the drive element 43, the exit-side glass substrate 42, the analyzer 45, and the diffusion film 46" on top of each other in this order from the liquid crystal layer 40 toward the exit side.

Further, in a case where a polarization-holding diffusion film (e.g., a diffusion film that diffuses light by total reflection at the internal refractive index boundary) is used as the diffusion film 46, the same effects can also be obtained from an embodiment of the liquid crystal display device in which the diffusion film 46 is replaced by such a polarization-holding diffusion film and the position of the diffusion film is changed so that the diffusion film is sandwiched between the drive element 43 and the exit-side glass substrate 42.

Further, the same effects can also be obtained by joining "the liquid crystal layer 40, the drive element 43, the polarization-holding diffusion film, the analyzer 45, and the exit-side glass substrate 42" or "the liquid crystal layer 40, the drive element 43, the exit-side glass substrate 42, the polarization-holding diffusion film, and the analyzer 45" on top of each other in this order from the liquid crystal layer 40 to the exit side in the liquid crystal display device shown in FIG. 10, instead of joining "the liquid crystal layer 40, the drive element 43, the polarization-holding diffusion film, the exit-side glass substrate 42, and the analyzer 45" on top of each other in this order from the liquid crystal layer 40 toward the exit side.

It should be noted that use of a surface shape diffusion film as the diffusion film 46 in the liquid crystal display device is preferable because the surface shape diffusion film needs a less thickness to give a top-hat-shaped diffusion characteristic than other types of diffusion film.

Further, in a case where the diffusion film 46 and the polarization-holding diffusion film further has an incidence-angle-independent diffusion characteristic (where regardless of the angle of incidence of incident light entering the diffusion film, the intensity distribution of diffusion of the light during transmission of the light through the diffusion film is constant), beams of light having passed through picture elements into which each liquid crystal display pixel has been spatially divided according to color have identical diffusion characteristics. This is preferable because an improvement in image quality is likely to be achieved.

Further, for higher image quality, it is preferable that the liquid crystal display device be configured such that the distance c from the liquid crystal layer 40 to the diffusion film 46 or to the polarization-holding diffusion film is given substantially as $c=b/m$, where m is the number of sources of light that enters a single picture element (in this example, $m=3$) and b is the distance from the microlens array 3A to the liquid crystal layer 40. It should be noted that it is more preferable that c be given as $c<b/(3\times m)$. In this case, there appears no overlap of light between those regions in the plane of the diffusion film 46 which correspond to all picture elements constituting the liquid crystal pixels, a further improvement in image quality is likely to be achieved. However, in a case where $c<<b/m$, there appears a big dark portion between those regions in the plane of the diffusion film 46 which correspond to all picture elements constituting the liquid crystal pixels, and in a case where $c>b/m$, there appears an overlap of light between those regions in the plane of the diffusion film 46 which correspond to picture elements of the same color. In either case, an improvement in image quality is unlikely.

A liquid crystal display device of the present invention is manufactured through the steps of manufacturing optical components to be used and assembling the optical components. However, due to variations in manufacturing, the optical components cannot be manufactured as designed and therefore cannot be assembled. Moreover, in consideration of manufacturing costs, it is necessary to manufacture the optical components with more or less deviations in shape from the design. Due to such problems as these, there might be a case where it is difficult to focus only beams of light corresponding to the picture elements of the liquid crystal layer constituting the pixel array. In such a case, the worst possible scenario would be to invite deterioration in display quality. In order to avoid such a situation, the present invention does not exclude provision of a color filter layer. That is, it is possible to employ such an embodiment in the liquid crystal display device as to further have a color filter layer provided between the entrance-side glass substrate and the exit-side glass substrate. However, use of a color filter layer makes it difficult to avoid a light loss, because the transmissivity is around 90% even at wavelengths at which light passes.

Figure 12:
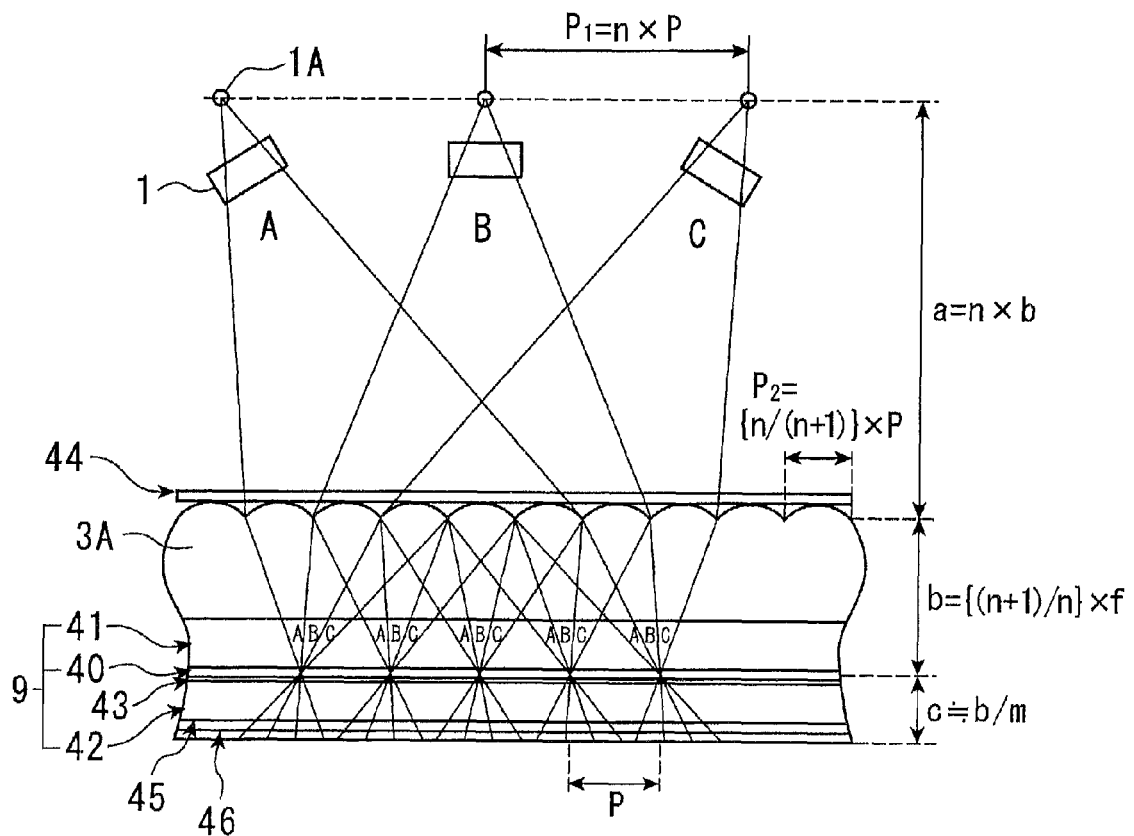
FIG. 12

Therefore, it is always better not to use a color filter layer. Further, the present invention can take such an embodiment in the liquid crystal display device that the position of the microlens array of the backlight system is changed so that the microlens array is sandwiched between the polarizer and the entrance-side glass substrate. An example of this embodiment is shown in FIG. 12. This example is an example of a case where the position of the microlens array 3A is changed so that the microlens array 3A is sandwiched between the polarizer 44 and the entrance-side glass substrate 41.

This allows the imaging optical to be manufactured during a liquid crystal element manufacturing process including a step of aligning the imaging optical system with a liquid crystal element 25, thus bringing about such an advantage that it is unnecessary to execute the step of aligning the imaging optical system with a liquid crystal display device (liquid crystal panel) after manufacturing, whereas such a step would be necessary if the imaging optical system were manufactured separately from the liquid crystal element.

The following describes a step of, in a method for manufacturing a liquid crystal display device of such an embodiment, forming a microlens array (fry-eye lens or lenticular lens) on a glass substrate.

First, an ultraviolet curing resin is applied onto a surface of the glass substrate by spin coating or dipping. Next, a light-blocking mask is placed in a virtual plane facing parallel to the surface at a predetermined plane-to-plane distance. In so doing, it is preferable that the light-blocking mask be placed so that a part where the microlens array is to be formed is irradiated with ultraviolet radiation through openings. Further, it is preferable that the light-blocking mask be placed between an exposure light source and the glass substrate. By irradiating the light-blocking mask with ultraviolet radiation from the exposure light source in this state of placement, part of the ultraviolet curing resin applied onto the glass substrate is exposed. Then, the microlens array is formed by developing and removing the unexposed part of the ultraviolet curing resin.

Further, the ultraviolet curing resin used is preferably a resin that does not cause a change in state of polarization. The reason for this is as follows: The formation of the ultraviolet curing resin on the glass substrate means the formation of the imaging optical system between the polarizer and the analyzer, and a change in state of polarization in the imaging optical system invites deterioration in image quality.

It should be noted that the liquid crystal display device does not change in display performance even if the liquid crystal layer and the drive element exchange their places with each other. Therefore, a liquid crystal display device obtained by swapping the liquid crystal layer and the drive element with each other in the above-mentioned liquid crystal display device is also encompassed in the scope of the present invention.

EXAMPLES

The following shows results specifically verified by using examples and comparative examples. However, the present invention is not to be limited solely to the following examples.

As an example of the present invention, a backlight system of an embodiment shown in (a) of FIG. 7 was manufactured by way of trial. The backlight system included an array of light sources 1 each constituted by three LEDs that emit R, G, and B light at dominant wavelengths, respectively. With light supplied from 3×3 blocks of the light source array along the direction of depth normal to the surface of (a) of FIG. 7 and along the horizontal direction across (a) of FIG. 7, a spatial luminance distribution of light exiting through the upper surfaces of microlenses was measured by a luminance chromaticity uniformity measuring apparatus (manufactured by Topcon Technohouse Corporation; UA-1000).

Each of the R, G, and B light sources 1 was constituted by a luminous point 10 and a focusing lens system 11. The luminous point 10 used was a packaged LED having an LED chip mounted therein. The focusing lens system 11 used was made of a material (refractive index=approximately 1.73) composed of glass (L-LAM72), and lenses used one by one for each luminous point 10 were double-sided aspheric lenses.

The RGB-LEDs were arrayed along the direction of depth normal to the surface of (a) of FIG. 7.

The solid-phase refractive index medium 6 used was made of a material composed of acrylic resin (refractive index=approximately 1.5), had a thickness of approximately 50 mm, blocks of the solid-phase refractive index medium 6 were arranged in parallel with each other at an intervals of 50 mm along the direction of depth normal to the surface of (a) of FIG. 7 and along the horizontal direction across (a) of FIG. 7.

The entrance surface 60, reflection surface 61, exit surface 62, and exit-side reflection surface 63 of the solid-phase refractive index medium 6 were configured as follows:

Entrance surface 60: Composed of lens surfaces each having a concave curvature in a plane orthogonal to or a convex curvature in a plane parallel to the direction of arrangement of light sources 1 of the same color. The shape of entrance surfaces of each block was such that entrance surfaces used for the colors of R, G, and B, respectively, were lens surfaces of the same shape, and the same shapes were arranged in parallel with each other for each block BLK of the light source array.

Reflection surface 61: Formed by depositing thin films of aluminum on lens surfaces each having a uniform shape in a plane orthogonal to the direction of arrangement of light sources 1 of the same color and having a sculptured surface shape, i.e., a combination of convex and concave curvatures, in a plane parallel to the direction of arrangement of light sources 1 of the same color.

Exit surface 62: Was one (surface S1) of two surfaces (tentatively called "surface S1" and "surface S2") between which the vertex angle of a single prism (vertex angle=60°, width=approximately 200 μm) serving as a unit element of the prism array lies.

Exit-side reflection surface 63: Formed by depositing a thin film of aluminum on the other surface (surface S2) of the two surfaces (surface S1, surface S2).

The microlens array 3A used was a lens array obtained by processing a material (refractive index=approximately 1.52), 2.5 mm in thickness, composed of glass (manufactured by SCHOTT, B270) so that each microlens serving as a unit element had substantially the same focal length of approximately 1.8 mm and substantially the same width of approximately 600 μm.

The pixel array 4 was configured such that picture elements corresponding to each separate one of the colors of RGB-LEDs and each having a size of approximately 200 μm are repeatedly placed at intervals of approximately 600 μm. However, in the measurement of a spatial luminance distribution, a diffusion sheet was placed, instead of the pixel array 4, on an exit surface of the microlens array 3A on which the pixel array 4 is supposed to be placed.

Figure 14:
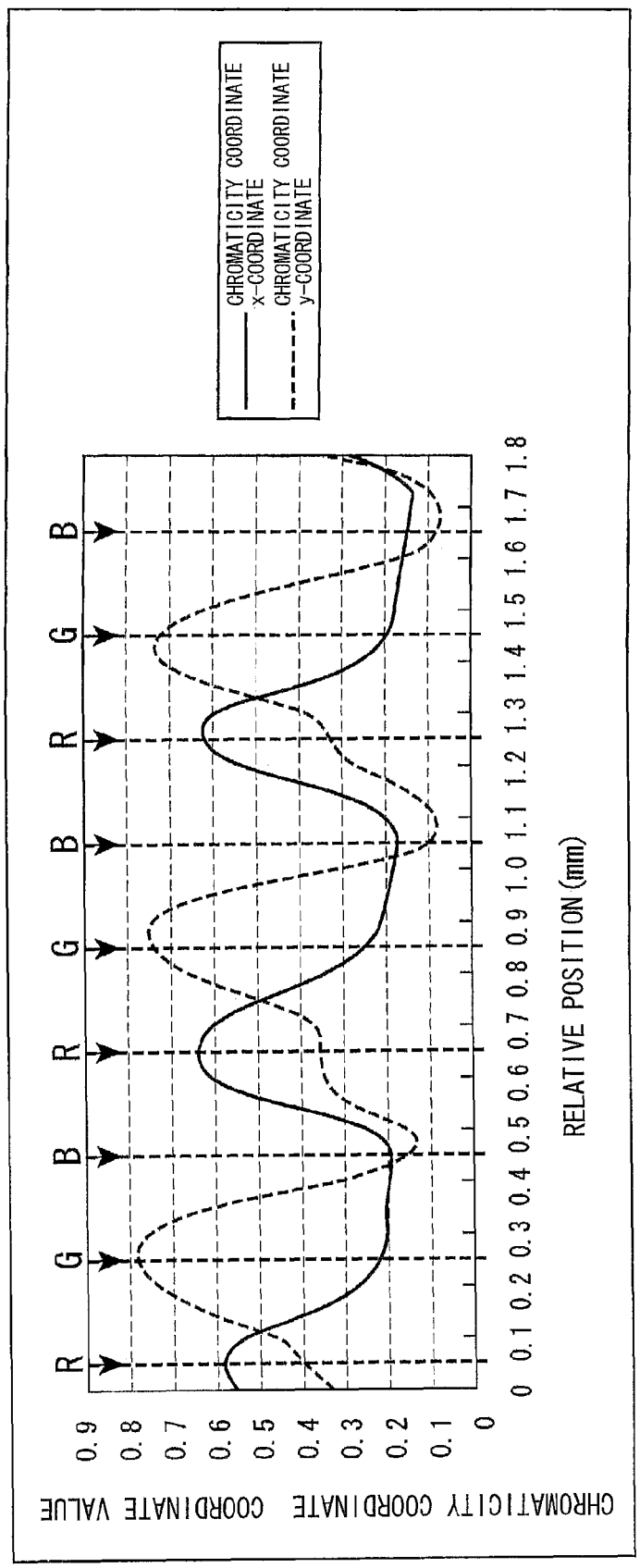
FIG. 14

FIG. 14 shows a result obtained by averaging a spatial distribution of chromaticity coordinates along a direction perpendicular to the direction along which RGB-LEDs are arrayed. The spatial distribution of chromaticity coordinates was measured by the luminance chromaticity uniformity measuring apparatus. FIG. 14 shows that because chromaticity coordinates indicate R, G, and B coordinate values at intervals of approximately 200 μm, beams of light from the LEDs that emit R, G, and B light at dominant wavelengths are separately focused onto picture elements corresponding to the colors of the RGB-LEDs of the pixel array, respectively.

Figure 15:
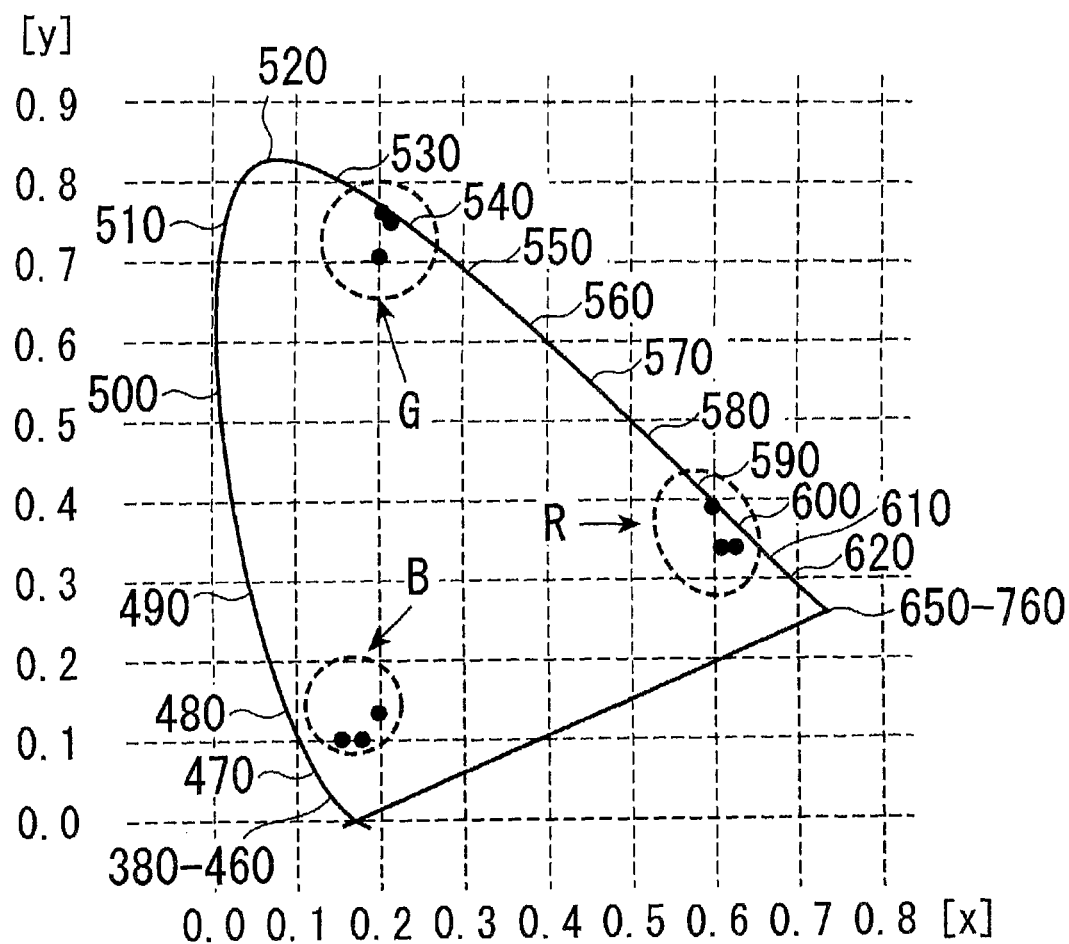
FIG. 15

Further, FIG. 15 shows a chromaticity diagram representing a spectral characteristic of beams of light having passed through areas near the centers of pixel elements corresponding to the colors of the RGB-LEDs, respectively, as indicated by the dotted line in FIG. 14. FIG. 15 also shows that beams of light having passed through picture elements corresponding to the colors of the RGB-LEDs separated from one another into the colors of R, G, and B, respectively.

A backlight system of the present invention includes: a light-emitting section having a plurality of light sources that emit beams of light at different dominant wavelengths from one another; and an imaging optical system including a plurality of microlenses that focus beams of light emitted from the light-emitting section, the backlight system irradiating a liquid crystal panel with beams of light having passed through the imaging optical system, the liquid crystal panel including a plurality of pixels arrayed at a predetermined pitch from each other, each of the pixels being configured to include a plurality of picture elements corresponding to each separate color, on the assumption that the pitch at which the pixels are arrayed is denoted as P and the imaging optical system has an imaging magnification of (1/n), the light sources being arrayed at a pitch $P_1$ given as $P_1 = n \times P$, the microlenses being arrayed at a pitch $P_2$ given as $P_2 = (n/(n+1)) \times P$.

The backlight system of the present invention is configured such that the imaging optical system includes a lens that deflects an optical path by way of (i) a surface shape of the lens or (ii) a distribution of refractive indices within the lens.

The backlight system of the present invention is configured such that the imaging optical system includes (i) a fly-eye lens, (ii) a lenticular lens, or (iii) a combination of the fly-eye lens and the lenticular lens.

The backlight system of the present invention is configured such that the light-emitting section is a light-emitting device including one type of or two or more types of LED light source, laser light source, or organic EL light source or a light-emitting device including the light source and a light guide.

The backlight system of the present invention is configured such that the LED light source is an LED lamp having an LED chip and a focusing lens system that focuses a beam of light from the LED chip or the organic EL light source is an organic EL lamp having an organic EL light-emitting section and a focusing lens system that focuses a beam of light from the organic EL light-emitting section.

The backlight system of the present invention is configured such that: the light-emitting section and the imaging optical system are divided into a plurality of blocks; and the light sources in the light-emitting section have their optical axes rotated so that beams of light emitted from the blocks of the light-emitting section substantially equally enter the corresponding blocks of the imaging optical system, respectively.

The backlight system of the present invention is configured to further include a PS conversion element which faces an entrance side of the imaging optical system and which includes (i) an element that transmits a particular polarized beam of light and reflects a remaining beam of light and (ii) a ½ wavelength plate on top of which the element is joined.

The backlight system of the present invention is configured to further include a plane mirror that reflects a beam of light emerging from the PS conversion element and causes the beam of light to enter the imaging optical system.

The backlight system of the present invention is configured to further include: a collimating reflecting mirror, which reflects a beam of light emerging from the PS conversion element and turns the beam of light into a substantially parallel beam; and a total reflection prism sheet, which totally reflects a beam of light emerging from the collimating reflecting mirror and causes the beam of light to enter the imaging optical system, wherein the light sources are each placed in an area substantially near a nonaxisymmetric focal position of the collimating reflecting lens.

The backlight system of the present invention is configured to further include a solid-phase refractive index medium that contains the PS conversion element, wherein: the solid-phase refractive index medium has a part in which the PS conversion element is contained, the part having an isosceles triangular cross-section by an isosceles part of which a beam of light from the PS conversion element is totally reflected; and each of the light sources emits a beam of light which enters the solid-phase refractive index medium and which is reflected by the isosceles part to form one of virtual image points that are arrayed at a pitch of n×P from each other.

The backlight system of the present invention is configured to further include: a solid-phase refractive index medium, which causes a beam of light from each of the light sources to enter the solid-phase refractive index medium through an entrance surface of the solid-phase refractive index medium, which causes the beam of light to be metallically reflected by a turn-back reflection surface of the solid-phase refractive index medium, which causes the beam of light to exit the solid-phase refractive index medium through an exit surface of the solid-phase refractive index medium; an optical sheet, which causes the beam of light having exited the solid-phase refractive index medium through the exit surface of the solid-phase refractive index medium to enter the optical sheet through an entrance surface of the optical sheet, which causes the beam of light to be reflected by a reflection surface of the optical sheet, and which causes the beam of light to exit the optical sheet through an exit surface of the optical sheet 7 toward the imaging optical system; and a refractive index matching member filling a space between the solid-phase refractive index medium and the optical sheet, wherein: the entrance surface of the solid-phase refractive index medium is a parallel arrangement of identical shapes for each separate block of the light-emitting section, and the turn-back reflection surface of the solid-phase refractive index medium is a parallel arrangement of metal-coated reflecting mirrors identical in shape for each separate block of the light-emitting section, the metal-coated reflecting mirrors serving to reflect beams of light from the entrance surface, and the exit surface of the solid-phase refractive index medium 6 has a planar shape; the entrance surface of the optical sheet is one of two surfaces between which the prism vertex angle of a prism sheet lies, and the reflection surface of the optical sheet is a surface obtained by coating the other of the two surfaces with a metal film, and the exit surface of the optical sheet has a planar shape; and the refractive-index matching member has an entrance surface and an exit surface that are in contact with the exit surface of the solid-phase refractive index medium and the entrance surface of the optical sheet, respectively.

The backlight system of the present invention is configured to further include a solid-phase refractive index medium, which causes a beam of light from each of the light sources to enter the solid-phase refractive index medium through an entrance surface of the solid-phase refractive index medium, which causes the beam of light to be metallically reflected by a turn-back reflection surface of the solid-phase refractive index medium, which causes the beam of light to exit the solid-phase refractive index medium through an exit surface of the solid-phase refractive index medium, which causes the beam of light to be again metallically reflected by an exit-side reflection surface of the solid-phase refractive index medium, and which causes the beam of light to exit to the imaging optical system, wherein: the entrance surface of the solid-phase refractive index medium 6 is a parallel arrangement of identical shapes for each separate block of the light-emitting section, and the turn-back reflection surface of the solid-phase refractive index medium is a parallel arrangement of metal-coated reflecting mirrors identical in shape for each separate block of the light-emitting section, the metal-coated reflecting mirrors serving to reflect beams of light from the entrance surface; and the exit surface of the solid-phase refractive index medium is one of two surfaces between which a prism vertex angle lies, and the exit-side reflection surface of the solid-phase refractive index medium is a surface obtained by coating the other of the two surfaces with a metal film.

The backlight system of the present invention is configured to further include: an optical sheet, which causes the beam of light having exited the solid-phase refractive index medium through the exit surface of the solid-phase refractive index medium to enter the optical sheet through an entrance surface of the optical sheet and which causes the beam of light to exit the optical sheet through an exit surface of the optical sheet 7 toward the imaging optical system; and a refractive index matching member filling a space between the solid-phase refractive index medium and the optical sheet, wherein: the entrance surface and exit surface of the optical sheet have planer shapes that are parallel to each other; the refractive-index matching member has an entrance surface and an exit surface that are in contact with the exit surface of the solid-phase refractive index medium and the entrance surface of the optical sheet, respectively; and the refractive index matching member fills a space between the exit surface of the solid-phase refractive index medium and the entrance surface of the optical sheet.

The backlight system of the present invention is configured such that the entrance surface of the solid-phase refractive index medium is composed of (i) flat surfaces or (ii) lens surfaces each having a convex or concave curvature in a plane(s) orthogonal and/or parallel to a direction of arrangement of light sources of a same color.

The backlight system of the present invention is configured such that the turn-back reflection surface of the solid-phase refractive index medium is composed of surfaces obtained by coating, with metal films, (i) flat surfaces or (ii) lens surfaces each having a convex or concave curvature in a plane(s) orthogonal and/or parallel to a direction of arrangement of light sources of a same color, so that the beams of light from the entrance surface of the solid-phase refractive index medium are deflected by metallic reflection substantially in parallel with each other in a plane parallel to the direction of arrangement of the light sources of the same color.

The backlight system of the present invention is configured to further include a PS conversion element provided in an optical path extending from the entrance surface of the solid-phase refractive index medium through inside of the solid-phase refractive index medium to the turn-back reflection surface of the solid-phase refractive index medium, the PS conversion element transmitting a particular polarized beam of light and reflects a remaining beam of light, the PS conversion element being joined on top of a ½ wavelength plate.

A composite backlight system of the present invention includes a plurality of backlight units arranged in parallel with each other, each of the plurality of backlight units being a backlight system as set forth in any of the above.

The composite backlight system of the present invention is configured to further include means for controlling an amount of light of the light emitting section(s) for each of or for every two or more of the plurality of backlight units.

The composite backlight system of the present invention is configured such that at least one type of the optical imaging systems of the plurality of backlight units are integral with each other so as to correspond to two or more of the plurality of backlight units.

A liquid crystal display device of the present invention has such a backlight system as that described above, the liquid crystal display device including: a liquid crystal element including a liquid crystal layer and entrance-side and exit-side glass substrates disposed on light entrance and exit sides, respectively, so that the liquid crystal layer is sandwiched therebetween; a drive element, which drives the liquid crystal element; a polarizer disposed on the entrance-side glass substrate of the liquid crystal element; an analyzer disposed on the exit-side glass substrate of the liquid crystal element; and a diffusion element disposed on an exit surface of the analyzer, the liquid crystal element, the drive element, the polarizer, the analyzer, and the diffusion element being on a side facing a light exit surface of the microlens array.

The liquid crystal display device of the present invention is configured such that the liquid crystal layer, the polarizer, and the entrance-side glass substrate are joined on top of each other in this order from the liquid crystal layer toward the entrance side.

The liquid crystal display device of the present invention is configured such that the liquid crystal layer, the drive element, the analyzer, the exit-side glass substrate, and the diffusion element are joined on top of each other in this order from the liquid crystal layer toward the exit side.

The liquid crystal display device of the present invention is configured such that the liquid crystal layer, the drive element, the analyzer, the diffusion element, and the exit-side glass substrate are joined on top of each other in this order from the liquid crystal layer toward the exit side.

The liquid crystal display device of the present invention is configured to further include a polarization-holding diffusion element provided between the drive element and the exit-side glass substrate.

The liquid crystal display device of the present invention is configured such that the liquid crystal layer, the drive element, the polarization-holding diffusion element, the analyzer, and the exit-side glass substrate are joined on top of each other in this order from the liquid crystal layer toward the exit side.

The liquid crystal display device of the present invention is configured such that the liquid crystal layer, the drive element, the exit-side glass substrate, the polarization-holding diffusion element, and the analyzer are joined on top of each other in this order from the liquid crystal layer toward the exit side.

The liquid crystal display device of the present invention is configured such that the diffusion element is a surface shape diffusion element.

The liquid crystal display device of the present invention is configured such that the diffusion element further has an incidence-angle-independent diffusion characteristic.

The liquid crystal display device of the present invention is configured such that the distance c from the liquid crystal layer to the diffusion element or to the polarization-holding diffusion element is given as c b/m, where m is the number of sources of light that enters a single picture element and b is the distance from each of the microlenses to the liquid crystal layer.

The liquid crystal display device of the present invention is configured to further include a color filter layer provided between the entrance-side glass substrate and the exit-side glass substrate.

The liquid crystal display device of the present invention is configured such that the imaging optical system is disposed between the polarizer and the entrance-side glass substrate.

The liquid crystal display device of the present invention is configured such that the liquid crystal element and the drive element have their places swapped.

Industrial Applicability

The present invention can be applied to liquid crystal display devices including backlights, etc.

Reference Signs List

1 Light source
1A Effective luminous point (virtual image of luminous point 10 by focusing lens system 11)
1B Virtual image point (virtual image point that appears when light having entered solid-phase refractive index medium 6 from effective luminous point 1A is totally reflected by isosceles part)
2 Light source optical axis
3 Imaging optical system
3A Microlens array
3a Microlens
3B PS conversion element
3C Flat mirror
3D Collimating reflecting mirror
3E Total reflection prism sheet
4 Pixel array
5 Pixel 6 Solid-phase refractive index medium (e.g., acrylic resin)
6A Part in which PS conversion element 3B is contained (isosceles triangular part)
7 Optical sheet
7A Optical sheet
8 Refractive index matching member
9 Liquid crystal element
10 Luminous point (e.g., LED chip or organic EL light-emitting section)
11 Focusing lens system
12 Light-emitting device
13 Light guide
14 (Pseudo-)light source
15 Light-source auxiliaries
21 Arrow (arrow pointing in direction that light source optical axis rotates)
30 Element that transmits particular polarized beam of light and reflects remaining beams of light
31 /1;2 wavelength plate
40 Liquid crystal layer
41 Glass substrate (entrance-side glass substrate)
42 Glass substrate (exit-side glass substrate)
43 Drive element
44 Polarizer
45 Analyzer
46 Diffusion film
50 Rear-surface frame
51 Column
60 Entrance surface
61 Turn-back reflection surface
62 Exit surface
63 Exit-side reflection surface
70 Entrance surface
71 Reflection surface
72 Exit surface
80 Entrance surface
81 Exit surface
BLK Block
MMC Metal-coated reflecting mirror
PRMS Prism sheet

The invention claimed is:

1. A backlight system comprising:
a light-emitting section having a plurality of light sources that emit beams of light at different dominant wavelengths from one another;
an imaging optical system including a plurality of microlenses that focus beams of light emitted from the light-emitting section;
a PS conversion element which faces an entrance side of the imaging optical system and which includes (i) an element that transmits a particular polarized beam of light and reflects a remaining beam of light and (ii) a ½ wavelength plate on top of which the element is joined; and
a plane mirror that reflects a beam of light emerging from the PS conversion element and causes the beam of light to enter the imaging optical system,
the backlight system irradiating a liquid crystal panel with beams of light having passed through the imaging optical system,
the liquid crystal panel including a plurality of pixels arrayed at a predetermined pitch from each other, each of the pixels being configured to include a plurality of picture elements corresponding to each separate color,
on the assumption that the pitch at which the pixels are arrayed is denoted as P and the imaging optical system has an imaging magnification of (1/n), the light sources being arrayed at a pitch $P_1$ given as $P_1 = n \times P$, the microlenses being arrayed at a pitch $P_2$ given as $P_2 = (n/(n+1)) \times P$.

2. The backlight system as set forth in claim 1, wherein the imaging optical system includes a lens that deflects an optical path by way of (i) a surface shape of the lens or (ii) a distribution of refractive indices within the lens.

3. The backlight system as set forth in claim 2, wherein the imaging optical system includes (i) a fly-eye lens, (ii) a lenticular lens, or (iii) a combination of the fly-eye lens and the lenticular lens.

4. The backlight system as set forth in claim 1, wherein the light-emitting section is a light-emitting device including one type of or two or more types of LED light source, laser light source, or organic EL light source or a light-emitting device including the light source and a light guide.

5. The backlight system as set forth in claim 4, wherein the LED light source is an LED lamp having an LED chip and a focusing lens system that focuses a beam of light from the LED chip or the organic EL light source is an organic EL lamp having an organic EL light-emitting section and a focusing lens system that focuses a beam of light from the organic EL light-emitting section.

6. The backlight system as set forth in claim 1, wherein:
the light-emitting section and the imaging optical system are divided into a plurality of blocks; and
the light sources in the light-emitting section have their optical axes rotated so that beams of light emitted from the blocks of the light-emitting section substantially equally enter the corresponding blocks of the imaging optical system, respectively.

7. The backlight system as set forth in claim 1, further comprising:
a solid-phase refractive index medium, which causes a beam of light from each of the light sources to enter the solid-phase refractive index medium through an entrance surface of the solid-phase refractive index medium, which causes the beam of light to be metallically reflected by a turn-back reflection surface of the solid-phase refractive index medium, which causes the beam of light to exit the solid-phase refractive index medium through an exit surface of the solid-phase refractive index medium;
an optical sheet, which causes the beam of light having exited the solid-phase refractive index medium through the exit surface of the solid-phase refractive index medium to enter the optical sheet through an entrance surface of the optical sheet, which causes the beam of light to be reflected by a reflection surface of the optical sheet, and which causes the beam of light to exit the optical sheet through an exit surface of the optical sheet toward the imaging optical system; and
a refractive index matching member filling a space between the solid-phase refractive index medium and the optical sheet, wherein:
the entrance surface of the solid-phase refractive index medium is a parallel arrangement of identical shapes for each separate block of the light-emitting section, and the turn-back reflection surface of the solid-phase refractive index medium is a parallel arrangement of metal-coated reflecting mirrors identical in shape for each separate block of the light-emitting section, the metal-coated reflecting mirrors serving to reflect beams of light from the entrance surface, and the exit surface of the solid-phase refractive index medium has a planar shape;
the entrance surface of the optical sheet is one of two surfaces between which the prism vertex angle of a prism sheet lies, and the reflection surface of the optical sheet is a surface obtained by coating the other of the two surfaces with a metal film, and the exit surface of the optical sheet has a planar shape; and the refractive-index matching member has an entrance surface and an exit surface that are in contact with the exit surface of the solid-phase refractive index medium and the entrance surface of the optical sheet, respectively.

8. The backlight system as set forth in claim 1, further comprising a solid-phase refractive index medium, which causes a beam of light from each of the light sources to enter the solid-phase refractive index medium through an entrance surface of the solid-phase refractive index medium, which causes the beam of light to be metallically reflected by a turn-back reflection surface of the solid-phase refractive index medium, which causes the beam of light to exit the solid-phase refractive index medium through an exit surface of the solid-phase refractive index medium, which causes the beam of light to be again metallically reflected by an exit-side reflection surface of the solid-phase refractive index medium, and which causes the beam of light to exit to the imaging optical system, wherein:

the entrance surface of the solid-phase refractive index medium is a parallel arrangement of identical shapes for each separate block of the light-emitting section, and the turn-back reflection surface of the solid-phase refractive index medium is a parallel arrangement of metal-coated reflecting mirrors identical in shape for each separate block of the light-emitting section, the metal-coated reflecting mirrors serving to reflect beams of light from the entrance surface; and the exit surface of the solid-phase refractive index medium is one of two surfaces between which a prism vertex angle lies, and the exit-side reflection surface of the solid-phase refractive index medium is a surface obtained by coating the other of the two surfaces with a metal film.

9. The backlight system as set forth in claim 8, further comprising:

an optical sheet, which causes the beam of light having exited the solid-phase refractive index medium through the exit surface of the solid-phase refractive index medium to enter the optical sheet through an entrance surface of the optical sheet and which causes the beam of light to exit the optical sheet through an exit surface of the optical sheet toward the imaging optical system; and a refractive index matching member filling a space between the solid-phase refractive index medium and the optical sheet, wherein:

the entrance surface and exit surface of the optical sheet have planer shapes that are parallel to each other;

the refractive-index matching member has an entrance surface and an exit surface that are in contact with the exit surface of the solid-phase refractive index medium and the entrance surface of the optical sheet, respectively; and the refractive index matching member fills a space between the exit surface of the solid-phase refractive index medium and the entrance surface of the optical sheet.

10. The backlight system as set forth in claim 7, wherein the entrance surface of the solid-phase refractive index medium is composed of (i) flat surfaces or (ii) lens surfaces each having a convex or concave curvature in a plane(s) orthogonal and/or parallel to a direction of arrangement of light sources of a same color.

11. The backlight system as set forth in claim 7, wherein the turn-back reflection surface of the solid-phase refractive index medium is composed of surfaces obtained by coating, with metal films, (i) flat surfaces or (ii) lens surfaces each having a convex or concave curvature in a plane(s) orthogonal and/or parallel to a direction of arrangement of light sources of a same color, so that the beams of light from the entrance surface of the solid-phase refractive index medium are deflected by metallic reflection substantially in parallel with each other in a plane parallel to the direction of arrangement of the light sources of the same color.

12. The backlight system as set forth in claim 7, further comprising a PS conversion element provided in an optical path extending from the entrance surface of the solid-phase refractive index medium through inside of the solid-phase refractive index medium to the turn-back reflection surface of the solid-phase refractive index medium, the PS conversion element transmitting a particular polarized beam of light and reflects a remaining beam of light, the PS conversion element being joined on top of a ½wavelength plate.

13. A composite backlight system comprising a plurality of backlight units arranged in parallel with each other, each of the plurality of backlight units being a backlight system as set forth in claim 1.

14. The composite backlight system as set forth in claim 13, further comprising means for controlling an amount of light of the light emitting section(s) for each of or for every two or more of the plurality of backlight units.

15. The composite backlight system as set forth in claim 13, wherein at least one type of the optical imaging systems of the plurality of backlight units are integral with each other so as to correspond to two or more of the plurality of backlight units.

16. A liquid crystal display device having a backlight system as set forth in claim 1, the liquid crystal display device comprising:

a liquid crystal element including a liquid crystal layer and entrance-side and exit-side glass substrates disposed on light entrance and exit sides, respectively, so that the liquid crystal layer is sandwiched therebetween;

a drive element, which drives the liquid crystal element;

a polarizer disposed on the entrance-side glass substrate of the liquid crystal element;

an analyzer disposed on the exit-side glass substrate of the liquid crystal element; and a diffusion element disposed on an exit surface of the analyzer, the liquid crystal element, the drive element, the polarizer, the analyzer, and the diffusion element being on a side facing light exit surfaces of the microlenses.

17. The liquid crystal display device as set forth in claim 16, wherein the liquid crystal layer, the polarizer, and the entrance-side glass substrate are joined on top of each other in this order from the liquid crystal layer toward the entrance side.

18. The liquid crystal display device as set forth in claim 16, wherein the liquid crystal layer, the drive element, the analyzer, the exit-side glass substrate, and the diffusion element are joined on top of each other in this order from the liquid crystal layer toward the exit side.

19. A liquid crystal display device, comprising:

A backlight system including:

a light-emitting section having a plurality of light sources that emit beams of light at different dominant wavelengths from one another; and an imaging optical system including a plurality of microlenses that focus beams of light emitted from the light-emitting section, the backlight system irradiating a liquid crystal panel with beams of light having passed through the imaging optical system, the liquid crystal panel including a plurality of pixels arrayed at a predetermined pitch from each other, each of the pixels being configured to include a plurality of picture elements corresponding to each separate color, on the assumption that the pitch at which the pixels are arrayed is denoted as P and the imaging optical system has an imaging magnification of (1/n), the light sources being arrayed at a pitch $P_1$ given as $P_1 = n \times P$, the microlenses being arrayed at a pitch $P_2$ given as $P_2 = (n/(n+1)) \times P$;

a liquid crystal element including a liquid crystal layer and entrance-side and exit-side lass substrates disposed on light entrance and exit sides respectively so that the liquid crystal layer is sandwiched therebetween;

a drive element, which drives the liquid crystal element;

a polarizer disposed on the entrance-side glass substrate of the liquid crystal element;

an analyzer disposed on the exit-side glass substrate of the liquid crystal element; and a diffusion element disposed on an exit surface of the analyzer, the liquid crystal element, the drive element, the polarizer, the analyzer, and the diffusion element being on a side facing light exit surfaces of the microlenses, and wherein the liquid crystal layer, the drive element, the analyzer, the diffusion element, and the exit-side glass substrate are joined on top of each other in this order from the liquid crystal layer toward the exit side.

20. The liquid crystal display device as set forth in claim 16, further comprising a polarization-holding diffusion element provided between the drive element and the exit-side glass substrate.

21. The liquid crystal display device as set forth in claim 20, wherein the liquid crystal layer, the drive element, the polarization-holding diffusion element, the analyzer, and the exit-side glass substrate are joined on top of each other in this order from the liquid crystal layer toward the exit side.

22. The liquid crystal display device as set forth in claim 20, wherein the liquid crystal layer, the drive element, the exit-side glass substrate, the polarization-holding diffusion element, and the analyzer are joined on top of each other in this order from the liquid crystal layer toward the exit side.

23. The liquid crystal display device as set forth in claim 16, wherein the diffusion element is a surface shape diffusion element.

24. The liquid crystal display device as set forth in claim 16, wherein the diffusion element further has an incidence-angle-independent diffusion characteristic.

25. The liquid crystal display device as set forth in claim 16, wherein the distance c from the liquid crystal layer to the diffusion element or to the polarization-holding diffusion element is given as $c \leq b/m$, where m is the number of sources of light that enters a single picture element and b is the distance from each of the microlenses to the liquid crystal layer.

26. The liquid crystal display device as set forth in claim 16, further comprising a color filter layer provided between the entrance-side glass substrate and the exit-side glass substrate.

27. The liquid crystal display device as set forth in claim 16, wherein the imaging optical system is disposed between the polarizer and the entrance-side glass substrate.

* * * * *